(12) United States Patent
Johnsen et al.

(10) Patent No.: US 8,015,458 B2
(45) Date of Patent: Sep. 6, 2011

(54) FAULT ISOLATION IN INTERCONNECT SYSTEMS

(75) Inventors: Bjorn Dag Johnsen, Oslo (NO); Ola Torudbakken, Oslo (NO); Inge Lars Birkeli, Lunner (NO); Andreas Bechtolsheim, Menlo Park, CA (US)

(73) Assignee: Oracle America, Inc., Redwood Shores, CA (US)

( * ) Notice: Subject to any disclaimer, the term of this patent is extended or adjusted under 35 U.S.C. 154(b) by 666 days.

(21) Appl. No.: 12/015,973

(22) Filed: Jan. 17, 2008

(65) Prior Publication Data
US 2008/0315889 A1   Dec. 25, 2008

Related U.S. Application Data

(60) Provisional application No. 60/945,778, filed on Jun. 22, 2007.

(51) Int. Cl.
*G01R 31/3193* (2006.01)
*G01R 31/40* (2006.01)
(52) U.S. Cl. .......................... 714/716; 714/741
(58) Field of Classification Search .............. None
See application file for complete search history.

(56) References Cited

U.S. PATENT DOCUMENTS

| | | | | |
|---|---|---|---|---|
| 4,793,816 A | * | 12/1988 | Pittman et al. | 439/79 |
| 5,420,886 A | * | 5/1995 | Ohmori | 375/258 |
| 5,436,554 A | * | 7/1995 | Decker, Jr. | 324/66 |
| 5,809,226 A | * | 9/1998 | Baldwin et al. | 714/43 |
| 6,651,177 B1 | * | 11/2003 | Rantze et al. | 713/300 |
| 2002/0061058 A1 | * | 5/2002 | Sommer | 375/213 |
| 2004/0073937 A1 | * | 4/2004 | Williams | 725/107 |
| 2004/0117525 A1 | * | 6/2004 | Lee | 710/104 |
| 2005/0080581 A1 | * | 4/2005 | Zimmerman et al. | 702/117 |
| 2005/0198373 A1 | * | 9/2005 | Saunderson et al. | 709/238 |
| 2005/0264299 A1 | * | 12/2005 | Manani et al. | 324/539 |

\* cited by examiner

*Primary Examiner* — Jeffrey A Gaffin
*Assistant Examiner* — Dipakkumar Gandhi
(74) *Attorney, Agent, or Firm* — Park, Vaughan, Fleming & Dowler LLP

(57) ABSTRACT

A loopback connector for a system can include a connector arrangement connectable to connector of a system component and/or a cable. The loopback connector can include loopback logic for simulating cable and/or system component functionality. In an example implementation the loopback connector can also operate to protect a system component and/or cable connector during shipping.

24 Claims, 25 Drawing Sheets

FIG. 1

FAULT ISOLATION IN INTERCONNECT SYSTEMS

RELATED APPLICATIONS

This application hereby claims priority under 35 U.S.C. §119 to U.S. Provisional Patent Application No. 60/945,778, filed on 22 Jun. 2007, entitled "COMMUNICATION SYSTEMS", by inventor(s) Bjorn Johnsen et al. The present application hereby incorporates by reference the above-referenced provisional patent application.

BACKGROUND

The invention relates to fault isolation in interconnect systems, for example to cable-based interconnects in communications system such as a switch fabric.

A cable-based interconnect system for a complex communications system can involve a large number of cables interconnecting system components. When problems with connectivity and communication across a cable-based interconnect link is identified, it is desirable to be able to limit the problem to either end-point (connector or interface logic) or to the cable itself (or potentially to a specific connector on the cable).

One approach to addressing this could be to move cables around. However, in general, even moving cables around may not provide a solution to fault isolation. Moreover, moving cables imposes other problems in terms of potentially having to obstruct other on-going data-traffic (i.e. when no idle and operational interconnect interface connector is available). Another difficulty is that damaged connector pins can cause the problem to propagate from the chassis connector to the cable connector (or vice versa), whereby moving cables around imposes a risk for "contaminating" healthy chassis connectors due to the cable connector being bad. In such cases, the diagnostics process could lead to more damage within the system as well as significant confusion until the contamination and/or inherent problem has been determined. Ideally, it is desirable to be able to isolate the problem as much as possible before any manual intervention is required.

An aim of the present invention is to at least mitigate at least some of the concerns identified above.

SUMMARY

An embodiment of the invention can provide a loopback connector for a cable system, the loopback connector comprising loopback logic for simulating at least one of cable functionality and system component functionality.

An embodiment of the invention can provide a method of using a loopback connector including connecting such a loopback connector to a connector of a system component or a cable and performing at least one loopback test for that system component or that cable. In an embodiment of the invention, the loopback connector can also be used during shipping to protect a connector of a system component or a cable in transit.

The use of the loopback connector can facilitate isolation of a problem to either side of the cable, whereby the number of manual test operations required is reduced, and hence, the chance of manual error as well as the total repair time may be significantly reduced. Also, the number of diagnostics operations that represents destructive interference with on-going data-traffic may be reduced.

An embodiment of the invention can provides a system comprising at least two subsystems interconnected via cables, the cables comprising connectors connectable to field replaceable units in the subsystems, wherein the system is operable automatically to check the mechanical connectivity formed by the cables independently of whether all system components are fully operational.

Although various aspects of the invention are set out in the accompanying independent and dependent claims, other aspects of the invention include any combination of features from the described embodiments and/or the accompanying dependent claims, possibly with the features of the independent claims, and not solely the combinations explicitly set out in the accompanying claims.

BRIEF DESCRIPTION OF THE DRAWINGS

Specific embodiments are described by way of example only with reference to the accompanying Figures in which:

FIG. 1 is a schematic representation of the rear of an example switch chassis;

Figure 2:
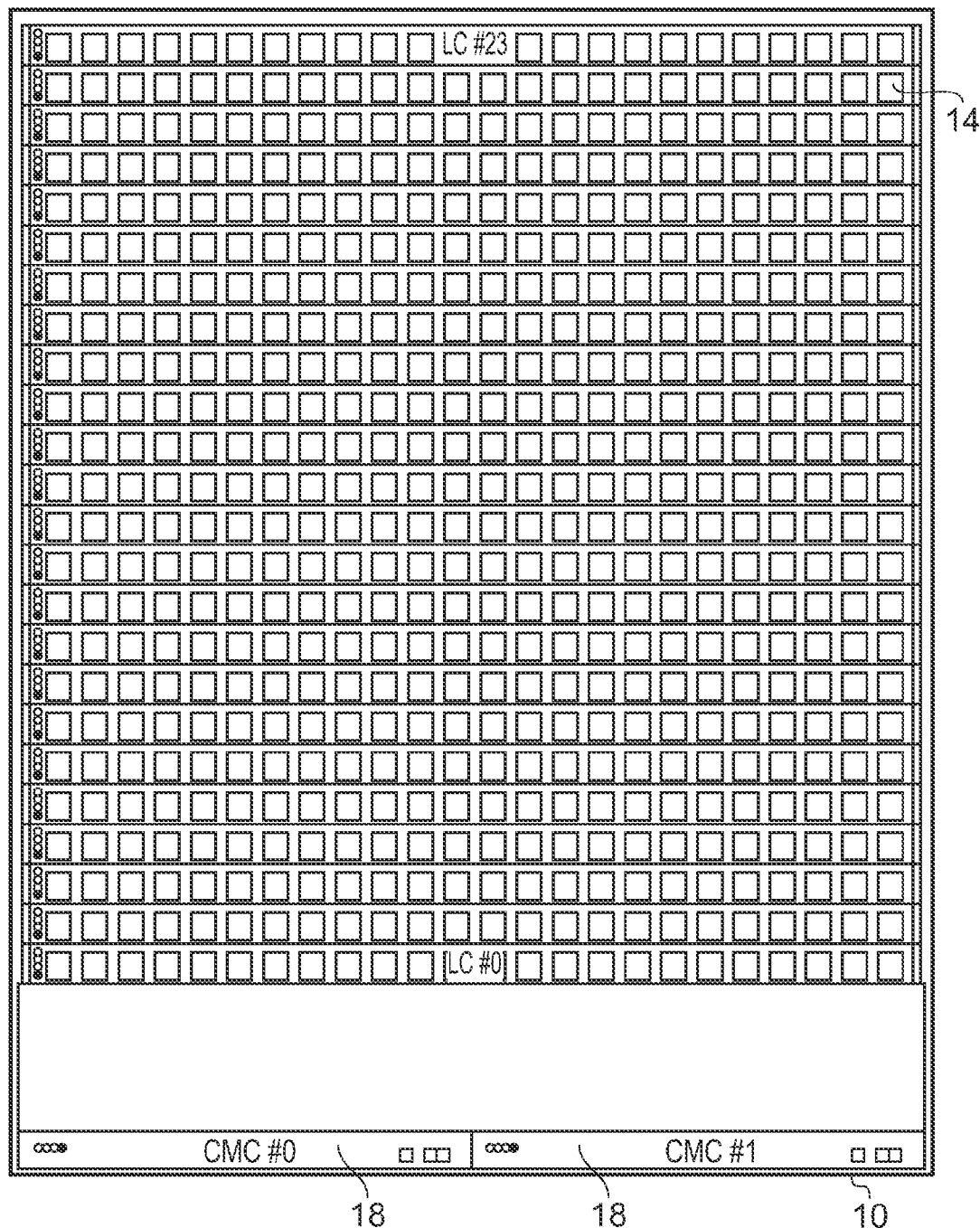
FIG. 2 is a schematic representation of the front of the example switch chassis.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention.

DETAILED DESCRIPTION

An example embodiment of a 3456-port InfiniBand 4× DDR switch in a custom rack chassis is described, with the switch architecture being based upon a 5-stage CLOS fabric. The rack chassis can form a switch enclosure.

The CLOS network, first described by Charles Clos in 1954, is a multi-stage fabric built from smaller individual switch elements that provides full-bisectional bandwidth for all end points, assuming effective dispersive routing.

Given that an external connection (copper or fiber) costs several times more per port than the silicon cost, the key to make large CLOS networks practical is to minimize the number of external cables required and to maximize the number of internal interconnections. This reduces the cost and increases the reliability. For example, a 5-stage fabric constructed with switching elements of size (n) ports supports $(n*n/2*n/2)$ edge points, using $(5*n/2*n/2)$ switch elements with a total of $(3*n*n/2*n/2)$ connections. The ratio of total to external connections is 5:1, i.e. 80% of all connections can be kept internal. The switch elements (switch chips) in the described example can be implemented using a device with 24 4× DDR ports.

An example switch uses a connector that support 3 4× ports per connector, which can further to minimize a number of cables needed. This can provides a further 3:1 reduction in the number of cables. In a described example, only 1152 cables ($\frac{1}{3}*n*n/2*n/2$) are required.

In contrast if prior commercially available 288-port switches and 24-port switches were used to create a 3456-port fabric a total of 6912 cables $(2*n*n/2*n/2)$ would be required.

The example switch can provide a single chassis that can implement a 5-stage CLOS fabric with 3456 4× DDR ports. High density external interfaces can be provided, including fiber, shielded copper, fiber and twisted pair copper. The amount of cabling can be reduced by 84.4% when compared to building a 3456-port fabric with commercially available 24-port and 288-port switches. In the present example, an orthogonal midplane design can be provided that is capable of DDR data rates.

An example switch can address a full range of HPC cluster computing from a few hundred to many thousand of nodes with a reliable and cost-effective solution that uses fewer chassis and cables than prior solutions.

Figure 1:
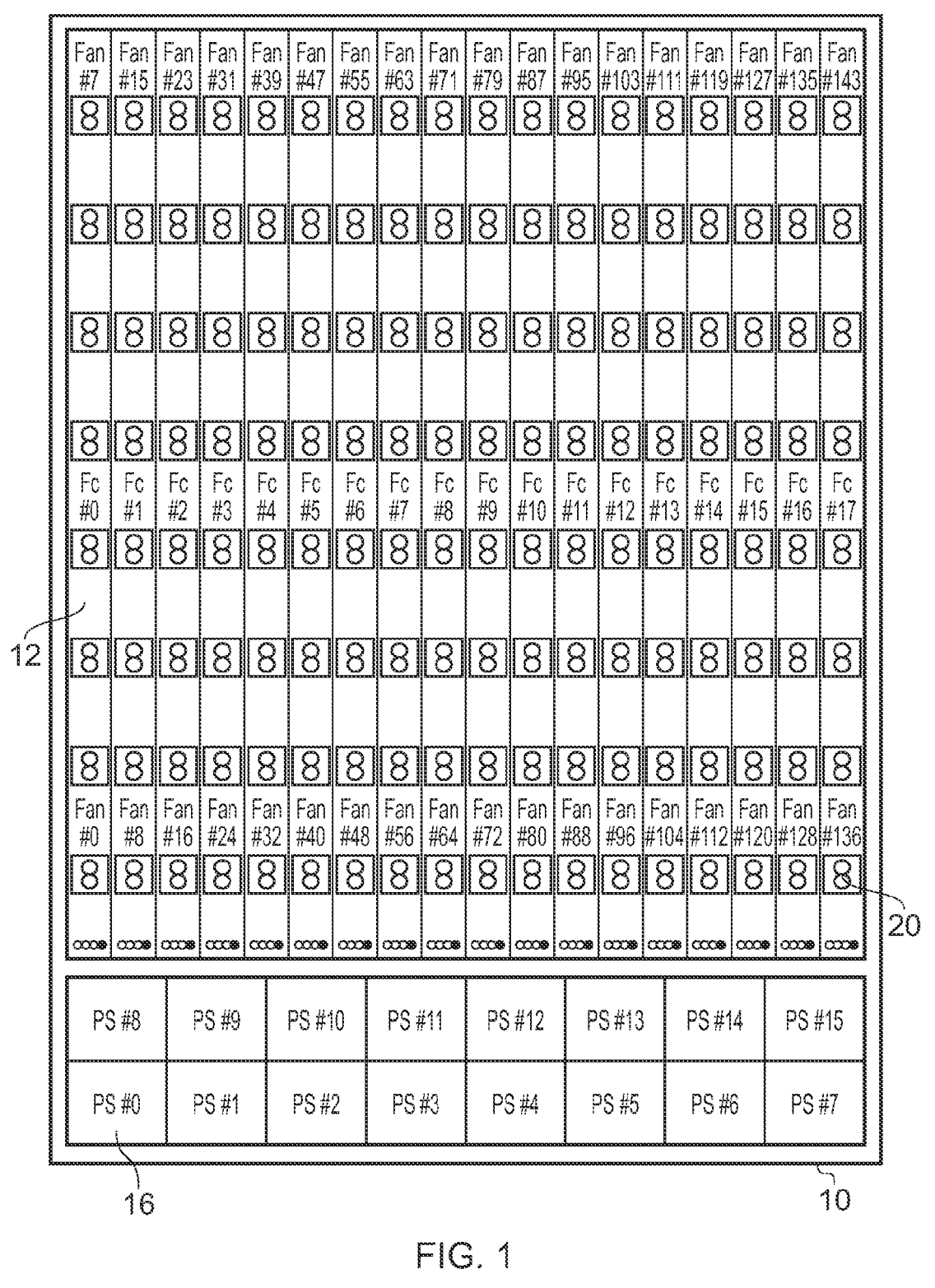

FIGS. 1 and 2 are schematic diagrams of an example of a switch chassis as viewed from the rear (FIG. 1) and front (FIG. 2), respectively. This example comprises a custom rack chassis 10 that is 60" high, 47" wide, and 36" deep, not including a cable management system. The present example provides a passive orthogonal midplane design (not shown in FIGS. 1 and 2) that provides a direct interface between Line Cards (LC) 12 and Fabric Cards (FC) 14. The line cards provide connections to external lines and the fabric card form switch fabric cards for providing switching functions.

In the present example, up to 18 fabric cards (FC0 to FC17) 12, FIG. 1 are provided. Each fabric card 12 plugs vertically into the midplane from the rear.

In the present example, up to 24 line cards (LC0 to LC23) 14, FIG. 2 can be provided. Each line card provides 144 4× ports (24 stacked 168-circuit cable connectors). Each line card plugs horizontally into the midplane from the front.

Up to 16 hot-pluggable power supply units (PS0-PS16) 16, FIG. 1 are each plugged into the chassis 10 from the rear. Each power supply unit 16 has an alternating current (AC) power supply inlet (not shown). The power supply units 16 plug into a power distribution board (PDB), which is not shown in FIGS. 1 and 2. Two busbars (not shown in FIGS. 1 and 2), one per group of 8 power supply units, distribute direct current (DC) supply to the line cards 12 and the fabric cards 14.

Two hot-pluggable Chassis Management Controllers (CMCs) 18, FIG. 2 plug into the power distribution board from the front. Each chassis management controller 18 comprises a mezzanine card.

The power distribution board is a passive power distribution board that supports up to 16 power supply units DC connectors and 2 chassis management controller slot connectors. The power distribution board connects to the midplane through ribbon cables that carry low-speed signals.

In the present example, up to 144 fan modules (Fan#0-Fan#143) 20 are provided, with 8 fan modules per fabric card 12 in the present instance. Cooling airflow in controlled to be from the front to the rear, using redundant fans on the fabric cards to pull the air from the line cards 14 through openings (not shown in FIGS. 1 and 2), in the midplane. The power supply units 16 have their own fans for cooling with the air exiting through the rear of the chassis. The power supply units 18 are also used to cool the chassis management controllers 18.

Figure 3:
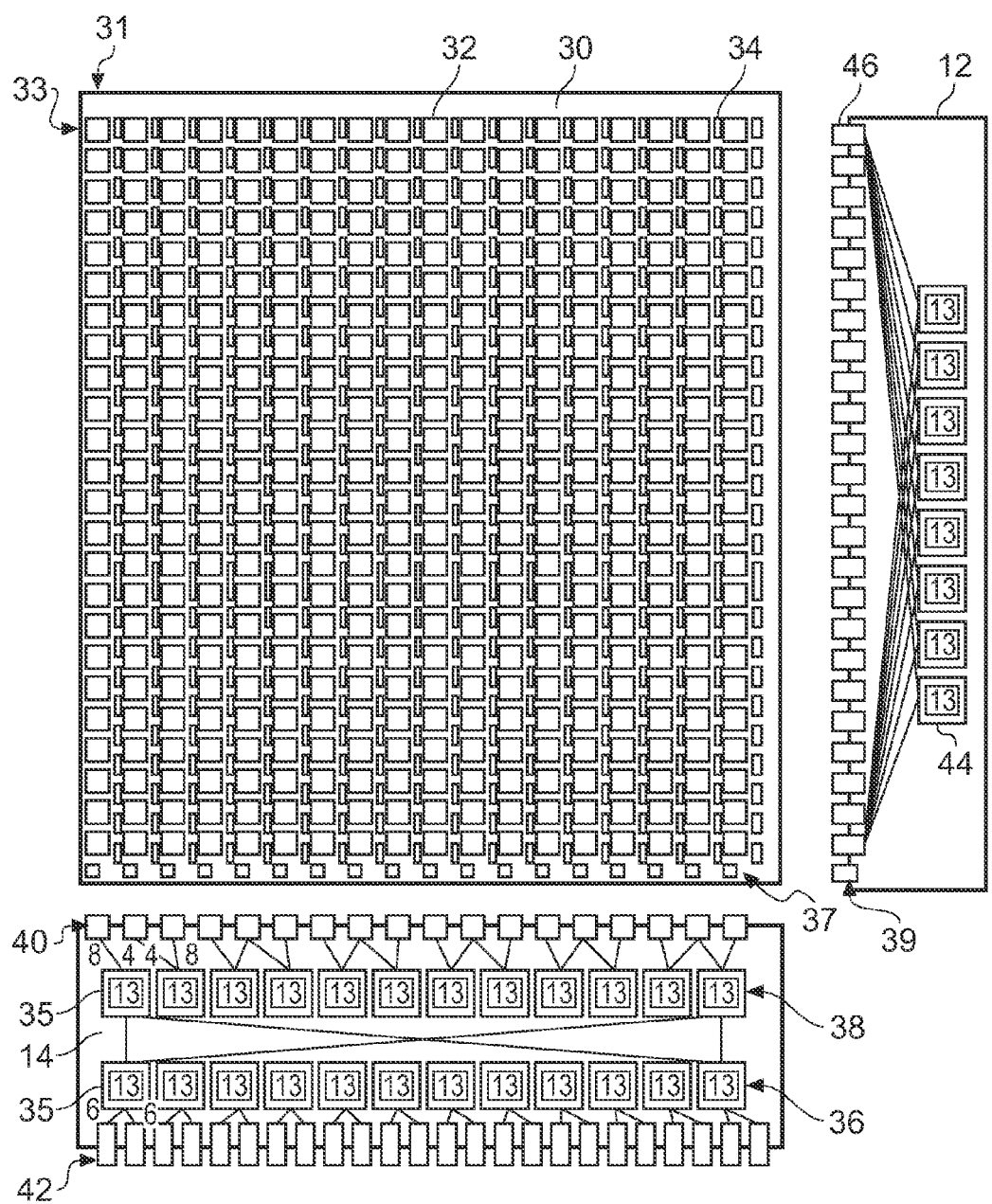
FIG. 3 is a schematic representation of a midplane illustrating the logical connectivity through the midplane between cards at the rear and cards at the front orientated orthogonally with respect to each other.

FIG. 3 is a schematic representation of a printed circuit board 30, which is configured as a midplane 30 in the switch chassis 10. The midplane 30 is configured in an orthogonal manner such that each fabric card 12 can connect to each of the line cards 14 without requiring any signal traces on the midplane 30. The orthogonal midplane design can provide excellent signal integrity in excess of 10 Gbps per differential pair.

The midplane 30 is represented schematically to show an array of midplane connector pairs 32 as black squares with ventilation openings shown as white rectangles. Each midplane connector pair 32 comprises a pair of connectors (to be explained in more detail later) with one connector on a first face of the midplane and a second connector on the other face of the midplane, the first and second connectors being electrically interconnected by way of pass-through vias (not shown in FIG. 3) formed in the midplane 30. As will be explained later, the first and second connectors of a midplane connector pair 32 are each multipath connectors. They are arranged orthogonally with respect to one another such that a first midplane connector of a midplane connector pair 32 is connectable to a fabric card 12 on a first side of the plane 30 in a first orientation and a second midplane connector of the midplane connector pair 32 is connectable to a line card on a second side of the plane 30 in a second orientation substantially orthogonally to the first orientation.

In an example described herein, each of the first connectors of the respective midplane connector pairs 32 of a column 31 of midplane connector pairs 32 can be connected to one fabric card 12. This can be repeated column by column for successive fabric cards 12. In an example described herein, each of the second connectors of the respective midplane connector pairs 32 of a row 33 of midplane connector pairs 32 can be connected to one line card 14. This can be repeated row by row for successive line cards 14. As a result, the midplane can be populated by vertically oriented fabric cards 12 on the first side of the midplane and horizontally orientated line cards 12 on the second side of the midplane 30.

In the present example the midplane 30 provides orthogonal connectivity between fabric cards 12 and the line cards 14 using orthogonal connector pairs. Each orthogonal connector pair provides 64 differential signal pairs, which is sufficient to carry the high-speed signals needed as well as a number of low-speed signals. The orthogonal connector pairs are not shown in FIG. 3, but are described later.

The midplane 30 is also configured to provide 3.3VDC standby power distribution to all cards and to provide I2C/System Management Bus connections for all fabric cards 12 and line cards 14.

Another function of the midplane 30 is to provide thermal openings for a front-to-rear airflow. The white holes in FIG. 3 (e.g., hole 34) form openings 34 in the midplane for airflow. In this example the midplane is approximately 50% open for airflow.

The fabric cards 12 each support 24 connectors and the line cards 14 each support 18 connectors.

FIG. 3 also illustrates an example of how the fabric cards 12, the midplane 20 and the line cards 14 interconnect. In this example there are 24 switch chips on a line card 14 and 8 chips on each of the 18 fabric cards 12.

As previously mentioned a 5-stage Clos fabric has a size n*n/2*n/2 in which n is the size of the switch element. The example switch element in FIG. 3 has n equal to 24 ports. Each line card 14 has 24 chips in 2 rows with 12 chips in each row. Each of 12 ports of each switch chip 35 in a first row 36 of the line card 14 is connected to 2 cable connectors 42, with 6 ports per cable connector. There are a total of 24 cable connectors per line card 14. Each cable connector can accommodate two physical independent cables that each carries 3 ports (links). Each cable connector 42 can accommodate 6 ports. The remaining 12 ports of each switch chip 35 in the first row 26 is connected to one chip 35 each in a second row 38 of chips 35.

There are 18 midplane connectors 32 per line card 14. Each midplane connector 32 provides one physical connection to one fabric card 14. Each midplane connector 32 can accommodate 8 4× links (there are 8 differential pairs per 4× link and a total of 64 differential pairs provided by the orthogonal connector)

12 ports of each of the switch chips 35 in the second row 38 of the line card 14 are connected to 2 line card connectors 40 that are used to connect the line card 14 to the midplane connectors 32 and thereby with the fabric cards 12 through the orthogonally oriented midplane connector pair. Of the 12 ports per switch chip 35, eight ports are connected to one line card connector 40, and the remaining four ports are connected to another line card connector 40 as represented by the numbers 8 and 4 adjacent the two left hand switch chips 35 in the second row 38. 2 switch chips are thereby connected to a group of 3 line card connectors 40 and hence to a group of three midplane connectors pairs 32.

The remaining 12 ports of each switch chip 35 in the second row 38 of the line card 14 are connected to each of the 12 switch chips 35 in the first row 36 of the line card 14.

At the fabric card 12 all links through an orthogonally oriented midplane connector pair 32 are connected to one line card 14. A single orthogonal connector 46 carries 8 links. These links are connected to one switch element 44 each at the fabric card 12.

Also shown in FIG. 3 are power connectors 37 on the midplane and power connectors 39 on the fabric cards 12.

There has been described a system with 24 line cards with 144 ports each, realized through 48 physical cable connectors that each carry 3 links. The switch fabric structure of each line card 14 is fully connected, so the line card 14 itself can be viewed upon as a fully non-blocking 144 port switch. In addition each line card 14 has 144 links that are connected to 18 fabric cards. The 18 fabric cards then connect all the line cards 14 together in a 5-stage non-blocking Clos topology.

Figure 4A:
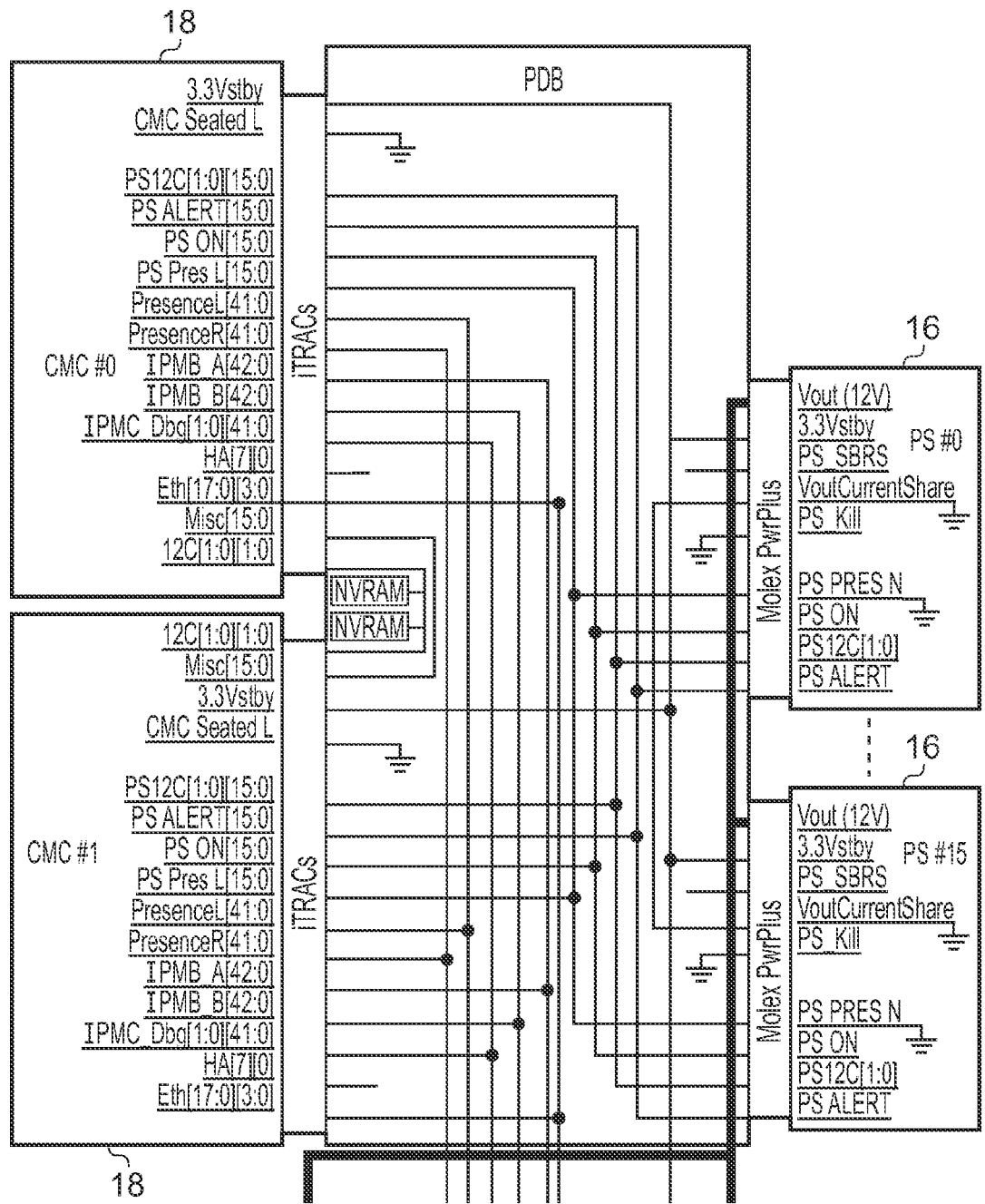
FIG. 4A is a schematic diagram of an example management infrastructure.
Figure 4B:
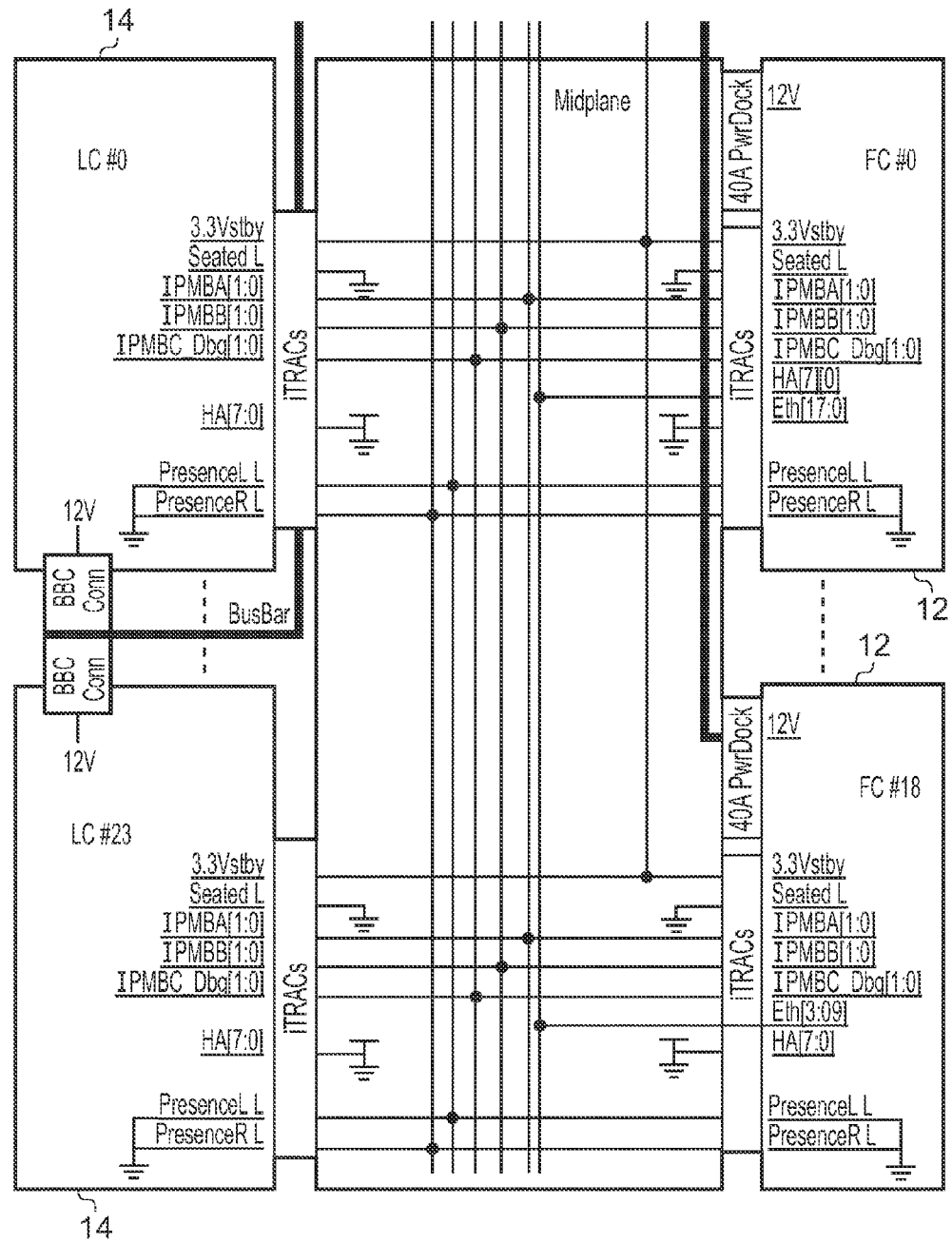
FIG. 4B continues the schematic diagram of FIG. 4A.

FIGS. 4A and 4B are schematic diagrams of an example management infrastructure. This example provides redundant chassis management controllers 18. In addition each fabric card 12 and line card 14 supports an management controller. There are redundant management connections from each chassis management controller 18 to each of the fabric card and line card management controllers. In addition there are I2C connections to each of the power supply units 16. The management connections pass between the fabric cards 12, the line cards 14, the power supply units 16 and the chassis management cards 18 via the midplane and the power distribution board 22 in the present example.

FIGS. 5 to 11 provide various schematic views of an example of a switch chassis in accordance with the invention.

Figure 5:
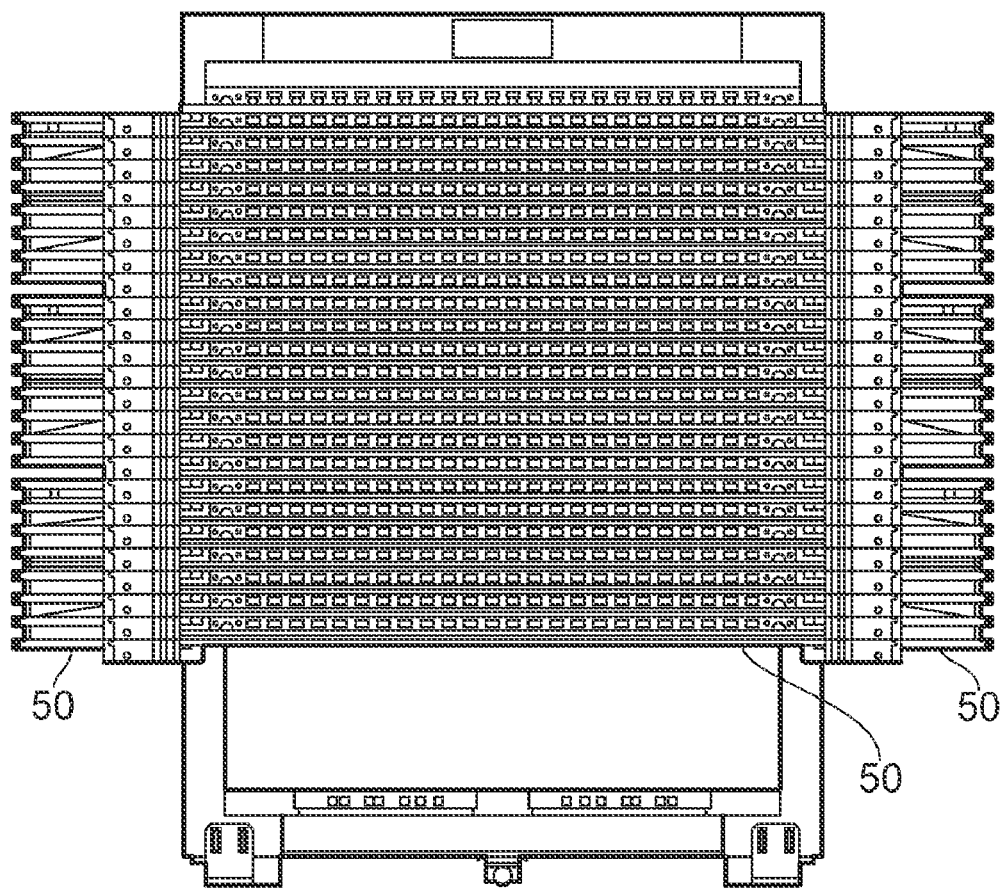
FIGS. 5 to 11 are views of an example of a switch chassis.
Figure 6:
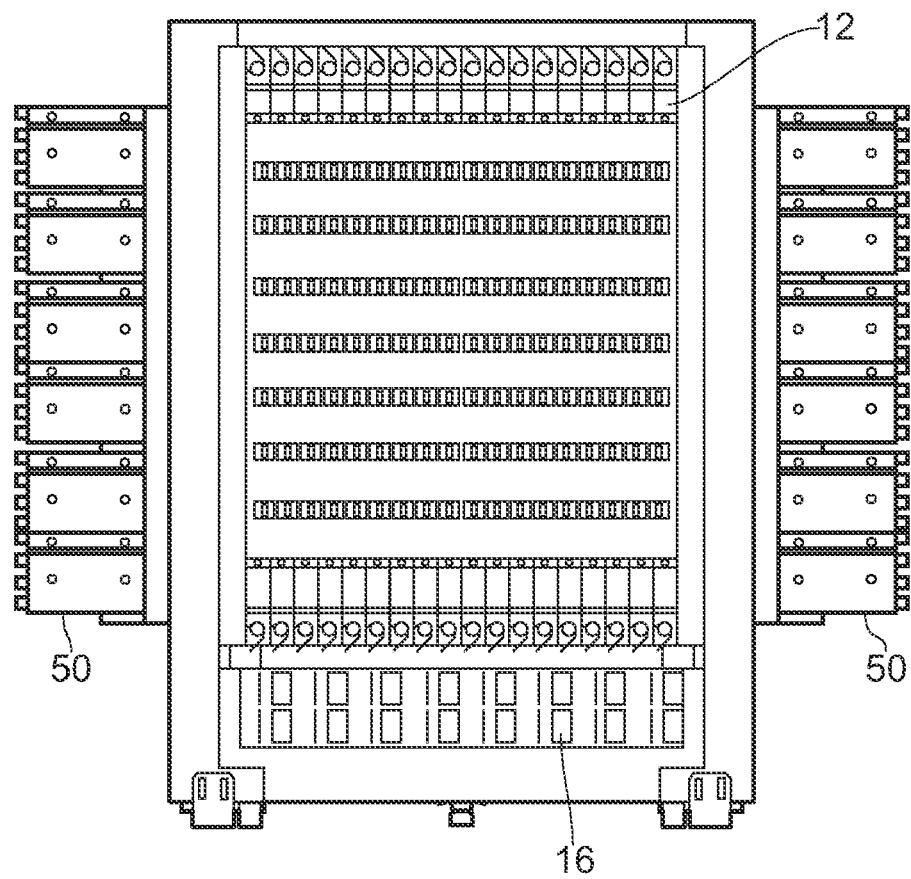
Figure 7:
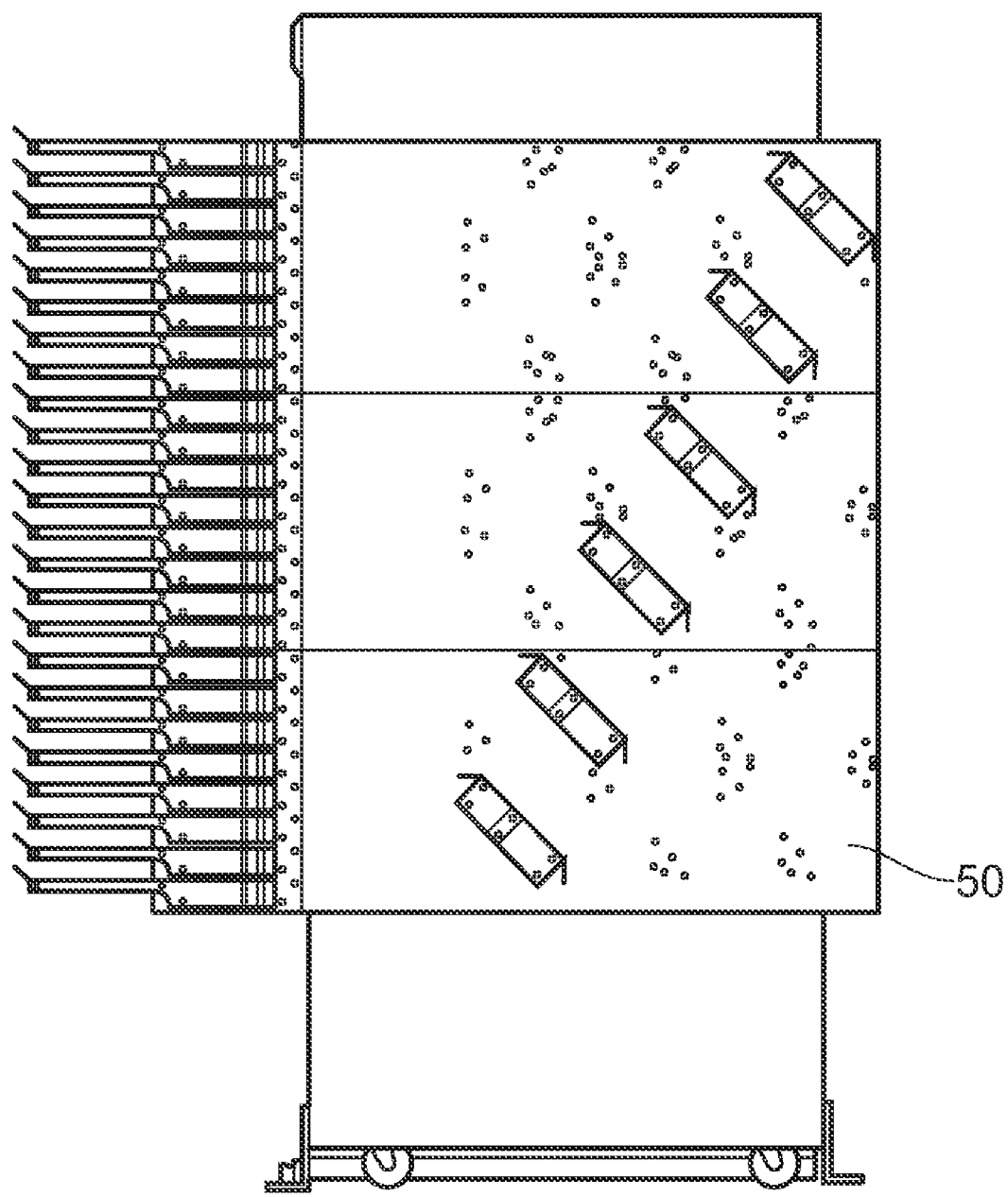
Figure 8:
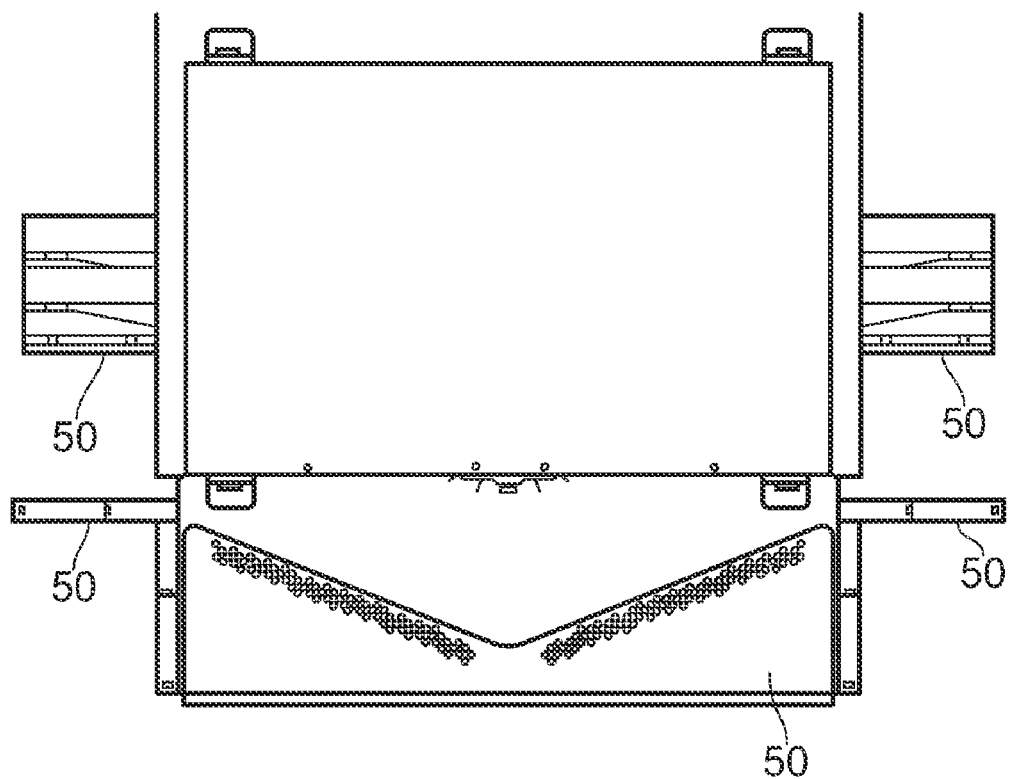
Figure 9:
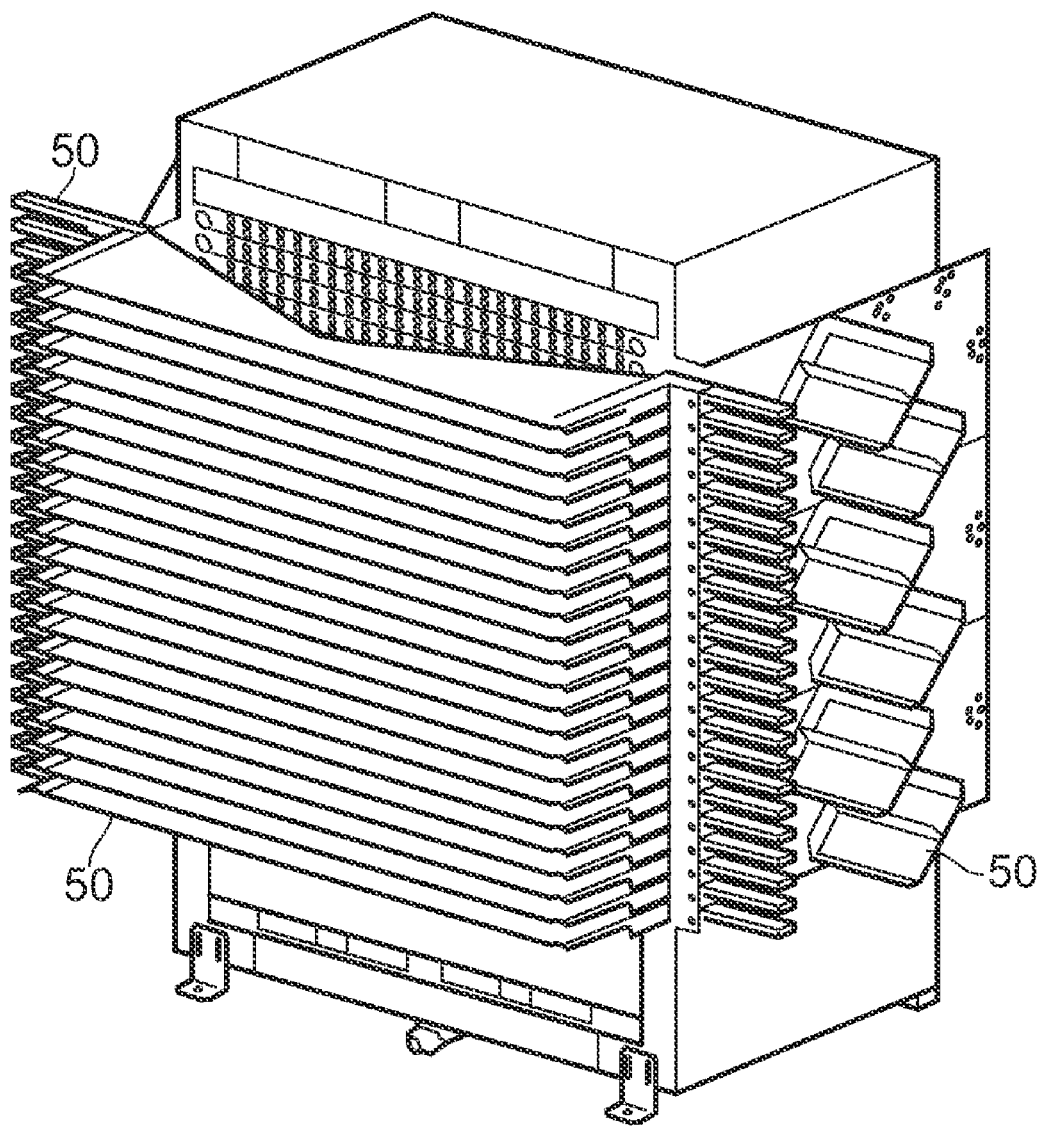
Figure 10:
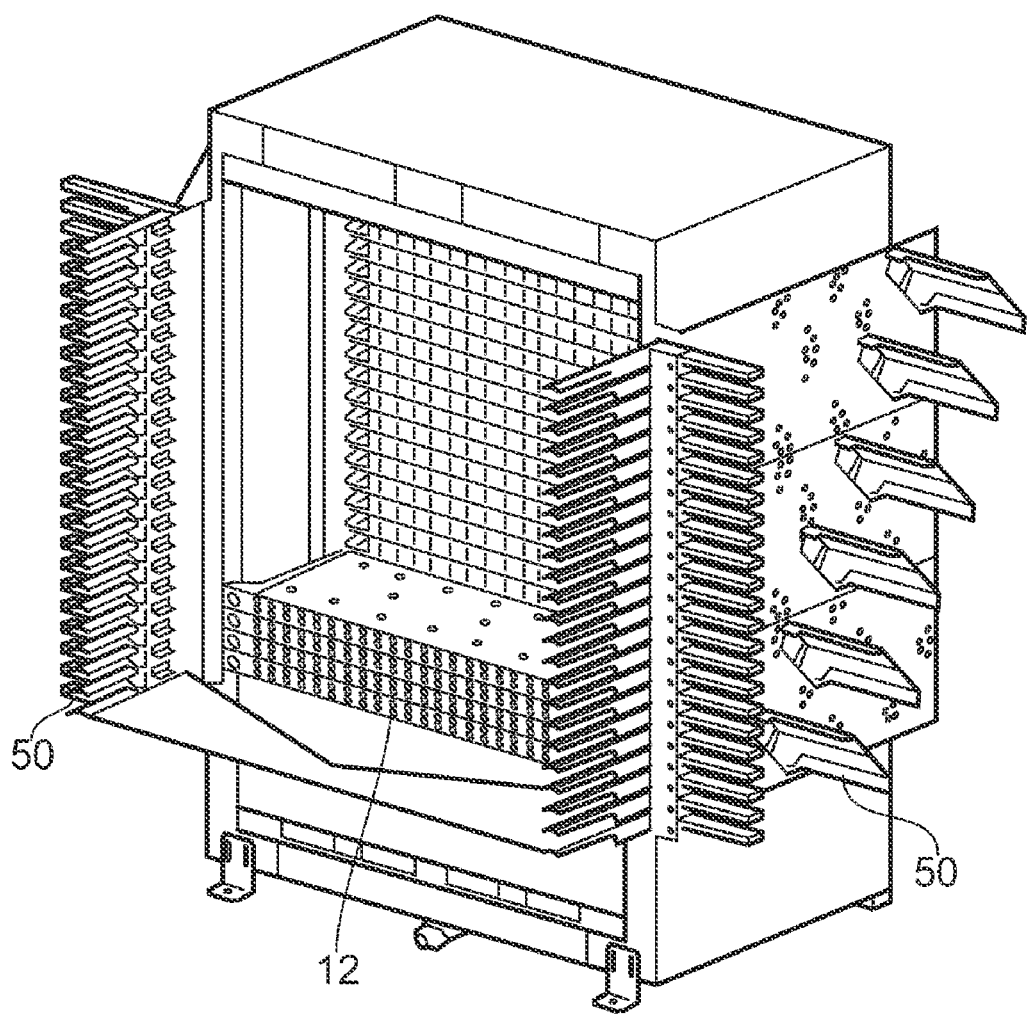
Figure 11:
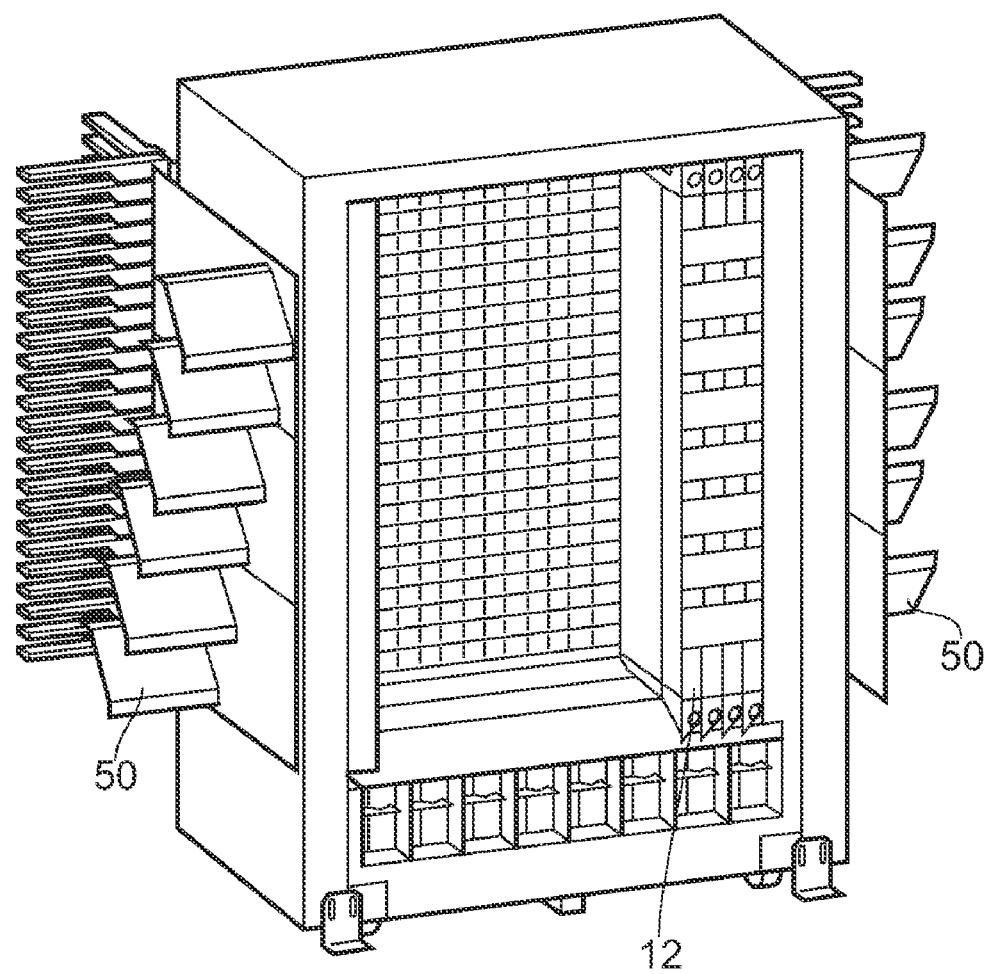

FIG. 5 is a front view of the switch chassis 10 showing cable management structures 50. FIG. 6 is a rear view of the switch chassis 10 showing the fabric cards 12, the power supply units 16 and cable management structures 50. FIG. 6 is a side view of the switch chassis 10 further showing the cable management structures 50. FIG. 8 is a side view of the switch chassis 10 further showing the cable management structures 50. FIG. 9 is an isometric view of the switch chassis 10 from the line card 14 (front) side further showing the cable management structures 50. FIG. 10 is an isometric view of the switch chassis 10 from the line card 14 (front) side showing four line cards 12 installed horizontally in the chassis 10 and part of the cable management structures 50. FIG. 11 is an isometric view of the switch chassis 10 from the fabric card 12 (rear) side showing four fabric cards 12 installed vertically in the chassis 10 and part of the cable management structures 50.

Figure 12:
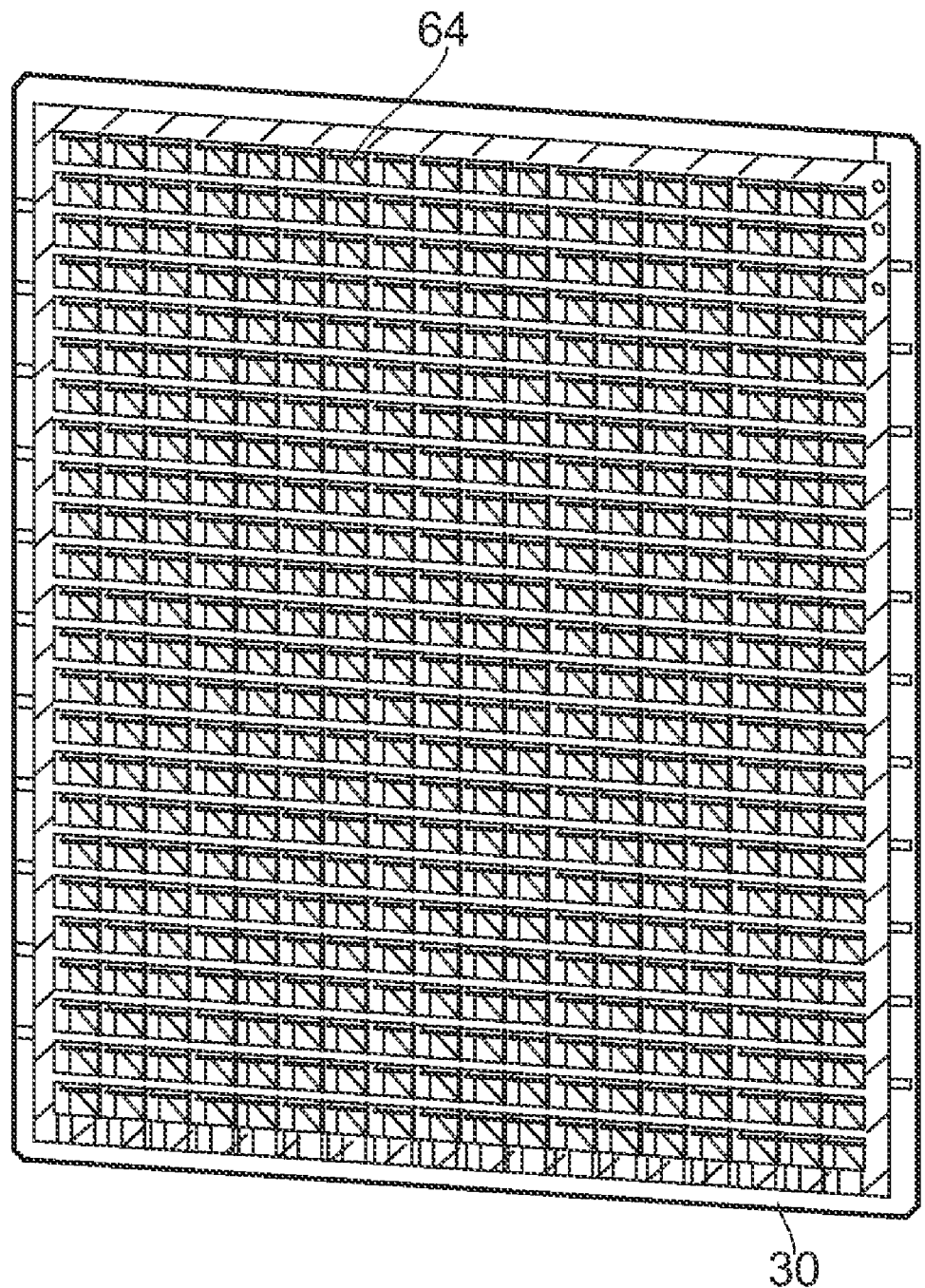
FIG. 12 is a first isometric view of an example of a midplane.
Figure 13:
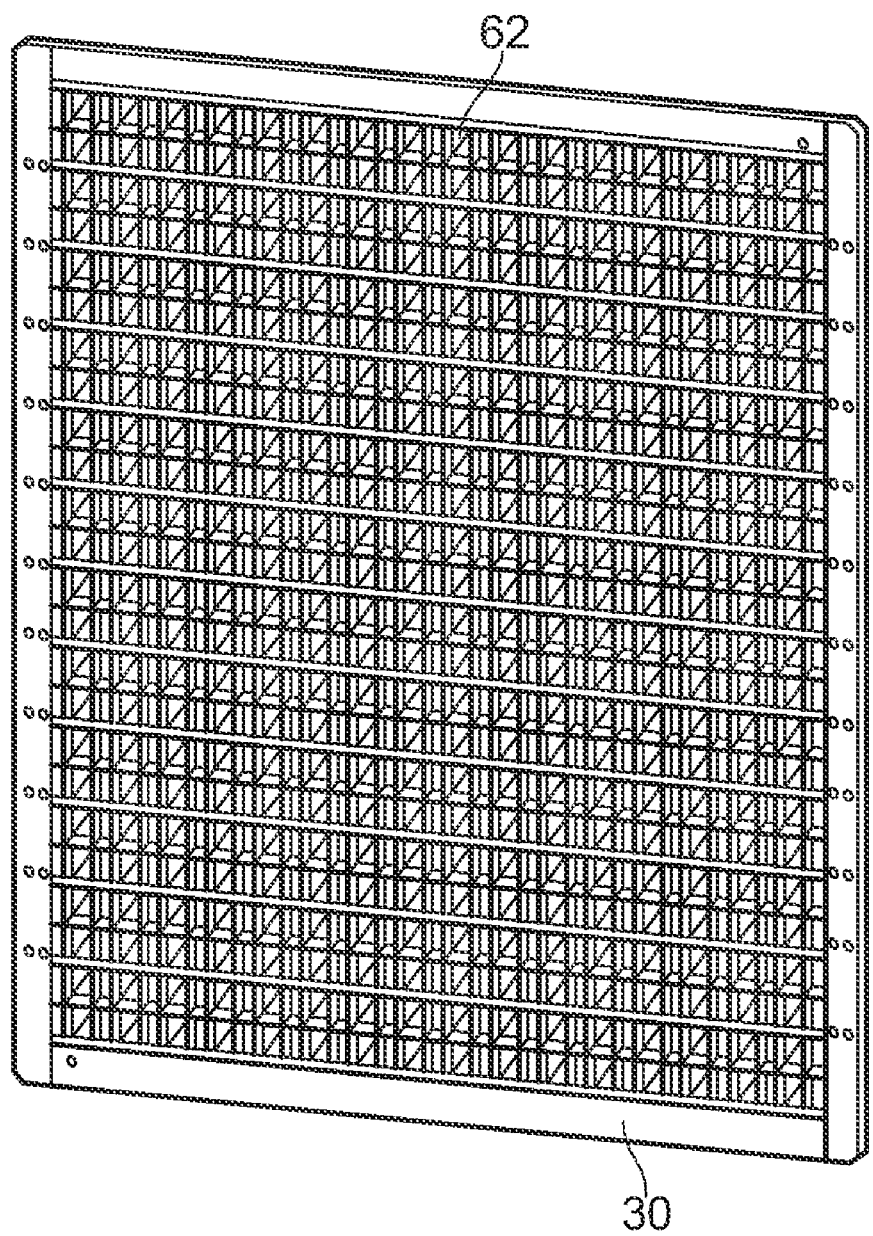
FIG. 13 is a further isometric view of an example of a midplane.

FIGS. 12 and 13 provide various schematic views of an example of a midplane 30 in accordance with the invention. FIG. 12 is an isometric view of the midplane 30 from the line card 14 (front) side and FIG. 13 is an isometric view of the midplane 30 from the fabric card 12 (rear) side. FIG. 12 shows the array formed from rows and columns of the second connectors 64 of the midplane connectors pairs 32 described with reference to FIG. 3. FIG. 13 shows the array formed from rows and columns of the first connectors 62 of the midplane connectors pairs 32 described with reference to FIG. 3.

Figure 14:
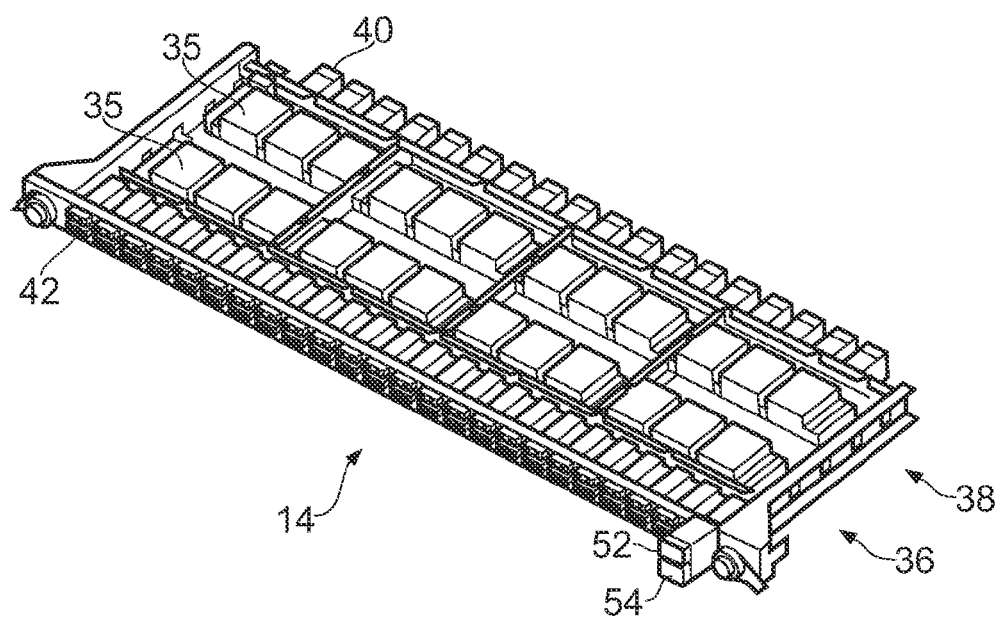
FIG. 14 is an isometric view of an example of a line card.

FIG. 14 is an isometric view of an example of a line card 14. This shows the first and second rows 36 and 38 of switch chips 35, the line board connectors 40 and the cable connectors 42. As can be seen in FIG. 14, the cable connectors 42 are stacked double connectors such each cable connector can connect to two cables 52 and 54.

Figure 15:
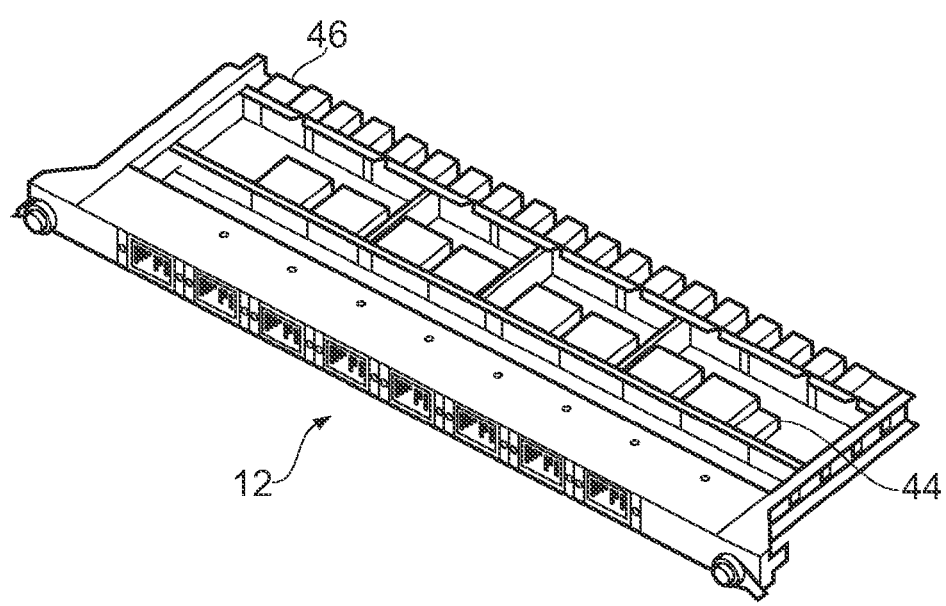
FIG. 15 is an isometric view of an example of a fabric card.

FIG. 15 is an isometric view of an example of a fabric card 12. This shows the fabric card connectors 46 and the switch elements 44.

Figure 16:
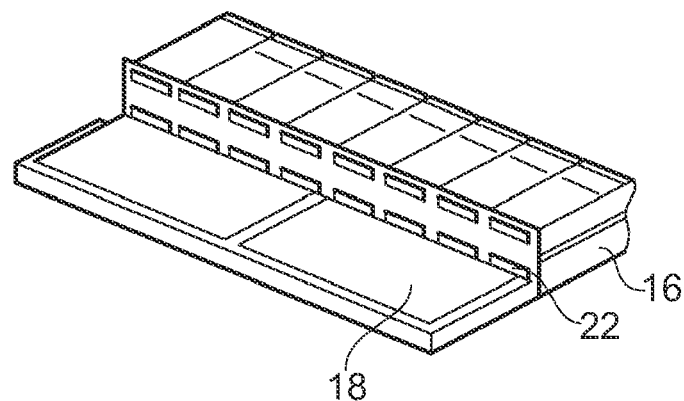
FIG. 16 is schematic representations of part of a switch chassis.
Figure 17:
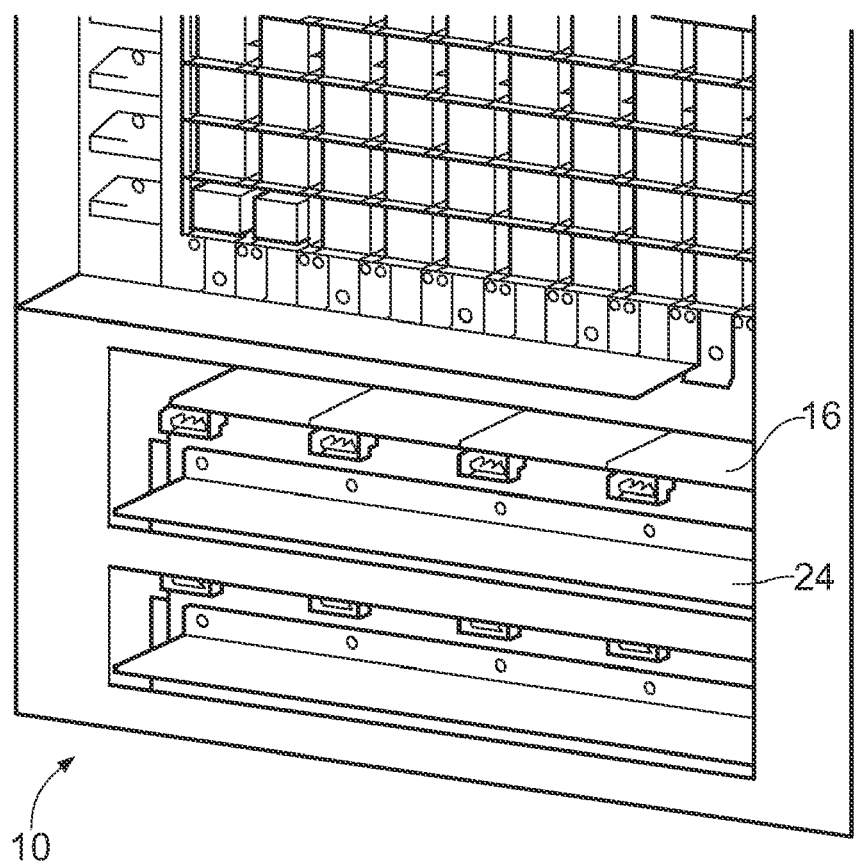
FIG. 17 is a further schematic representation of part of a switch chassis.

FIG. 16 is a schematic representation of an example of two chassis management controllers 18 plugged into one side of a power distribution board 22 and 16 power supply units 16 plugged into the other side of the power distribution board 22. In the present example, the chassis management controllers 18 are plugged into the front side of the power distribution board 22 and the power supply units 16 are plugged into the rear side of the power distribution board 22 as mounted in the switch chassis. FIG. 17 illustrates bus bars 24 for a 3.3V standby supply.

In the present example the midplane 30 is a passive printed circuit board that has dimensions of 1066.8 mm (42")×908.05 mm (35.75")×7.1 mm (0.280"). The active area is 40"×34". 864 8×8 midplane connectors (432 midplane connectors per side) are provided. There is a ribbon cable connection the power distribution board 22 and a 3.3V standby copper bar to the power distribution board 22.

In the present example a fabric card 12 comprises a printed circuit board with dimensions of 254 mm (10")×1016 mm (40")×4.5 mm (177"). It comprises 24 8×8 fabric card connectors 46, one power connector 39, 8 fan module connectors and 8 switch chips 44.

In the present example a line card 14 comprises a printed circuit board with dimensions of 317.5 mm (12.5")×965.2 mm (38")×4.5 mm (177"). It comprises 24 stacked cable 168-circuit connectors 42, 18 8×8 card connectors 40, 1 busbar connector and 24 switch chips 35.

In the present example a power distribution board 22 comprises a printed circuit board, 16 power supply DC connectors, 14 6×6 card connectors (7 connectors per chassis management card 18, ribbon cable connectors for low-speed connectivity to the midplane 30, and a 3.3V standby copper bar to the midplane 30.

In the present example a chassis management card 18 comprises 14 6×6 card connectors (7 connectors per chassis management card), two RJ45 connectors for Ethernet available on a chassis management card panel, two RJ45 connectors for serial available at the chassis management card panel, three RJ45 for line card/fabric card debug console access at the chassis management card panel, three HEX rotary switches used to select between which line card/fabric card debug console is connected to the three RJ45s above, and a 220-pin connector for the mezzanine.

In the present example a mezzanine has dimensions: 92.0 mm×50.8 mm and comprises 4 mounting holes screw with either 5 mm or 8 mm standoff from the chassis management card board, a 220-pin connector for connectivity to chassis management board.

Figure 18:
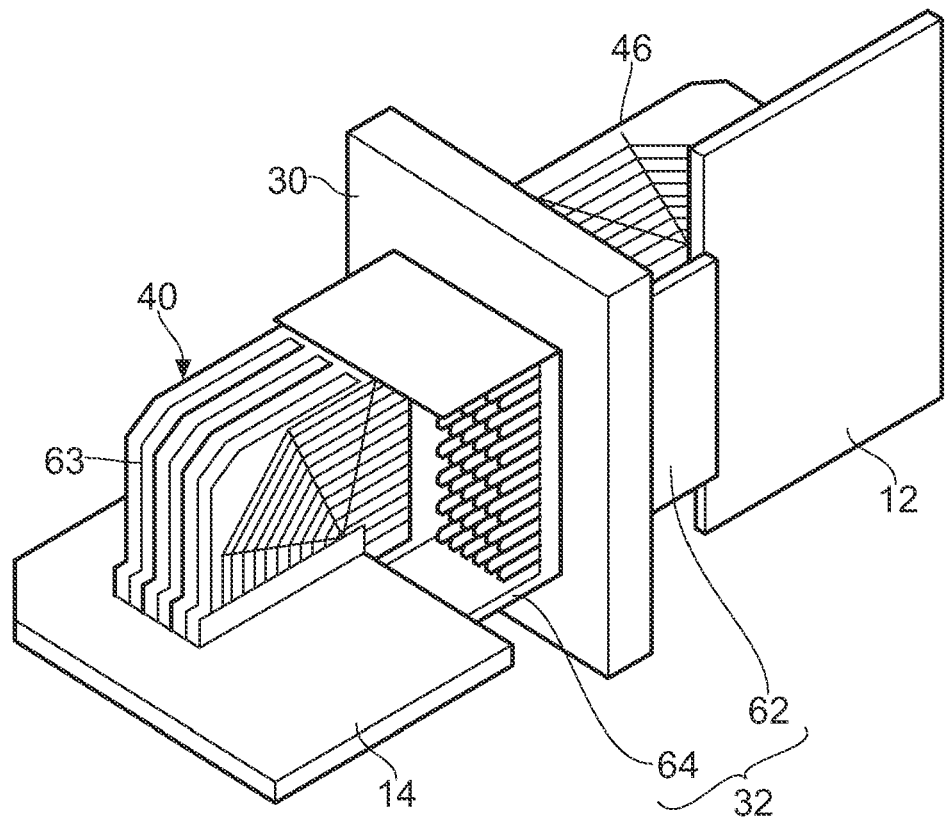
FIG. 18 is a schematic representation of the connections of two cards orthogonally with respect to each other.

FIG. 18 is a schematic isometric view of an example of a midplane connector pair 32. As can be seen in FIG. 18, the connector comprises a first, fabric side, connector 62 and a second, line card side, connector 64. In this example, each of the connector 62 and 64 is substantially U-shaped and comprises an 8×8 array of contact pins.

It will be noted that the second connector 64 of the midplane connector pair 32 is rotated through substantially 90 degrees with respect to the first connector 62. The first connector 62 is configured to connect to a corresponding fabric card connector 46 of a fabric card 12. The second connector 62 is configured to connect to a corresponding fabric card connector 46 of a line card 14. Through the orientation of the second connector 64 of the midplane connector pair 32 substantially orthogonally to the orientation of the first connector 62, it can be seen that the line card 14 is mounted substantially orthogonally to the fabric card 12. In the present example the line card 14 is mounted substantially horizontally and the fabric card is mounted substantially vertically 12.

Each of the contact pins on the connector 62 is electrically connectable to a corresponding contact of the fabric card connector 46. Each of the contact pins on the connector 64 is electrically connectable to a corresponding contact of the line card connector 40. The connector pins of the respective connectors 62 and 64 are connected by means of pass-through vias in the midplane 30 as will now be described in more detail.

Figure 19:
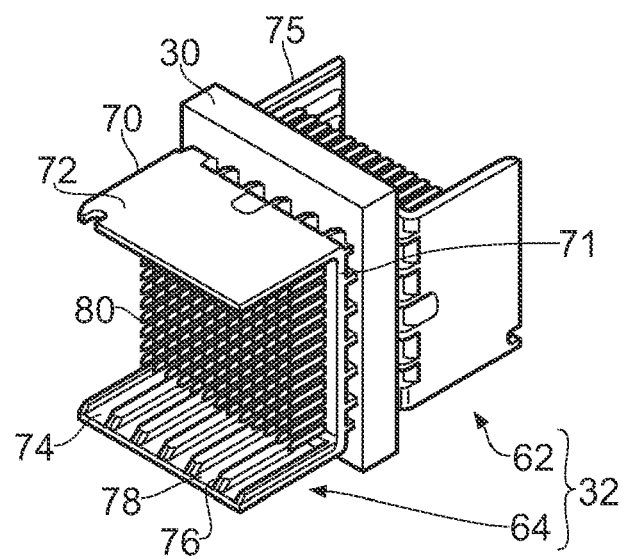
FIG. 19 is a schematic representation of an example of orthogonally arranged connectors.

FIG. 19 illustrates an example of the configuration of a first midplane connector 62 and a second midplane connector 64 of a midplane connector pair 32 in more detail. In the example shown in FIG. 19 that second connector 64 (the line card side connector) comprises a substantially U-shaped frame 70 including a substantially planar base 71 and first and second substantially planar walls 72 and 74 that extend at substantially at 90 degrees from the base 71. The inside edges of the first and second substantially planar sides 72 and 74 are provided with ridges 76 and grooves 78 that provide guides for the line card connector 40.

As can be seen in FIG. 18, the line card connector 40 has a structure that comprises a plurality of contact planes 63 that are aligned side by side, such that it has a generally planar construction that extends up from the line card 14. Line card connector planes comprise printed circuit boards carrying traces leading to contacts. The traces and contacts can be provided on both sides of the printed circuit boards of the line card connector planes.

By comparing FIGS. 18 and 19, it can be seen that each contact plane 63 of the line card connector 40 can be entered into a respective one of the grooves 78 so that connectors of the line card connector 40 can then engage with contact pins 80 of the second connector 64. In the case of the line card side connector portion 64, the orientation of second connector 64 and the grooves 78 therein means that the line card 12 is supported in a substantially horizontal orientation. In the example shown in FIG. 19, an 8×8 array of connector pins 80 is provided.

The first midplane connector 62 (fabric card side connector) of the midplane connector pair 32 has substantially the same form as the second midplane connector 62 of the midplane connector pair 32, except that it is oriented at substantially 90 degrees to the second midplane connector 64. In this example the second midplane connector 62 comprises a substantially U-shaped support frame 75 including a substantially planar base and first and second substantially walls and that extend at substantially at 90 degrees from the base. The inside edges of the first and second substantially planar sides are provided with ridges and grooves that provide guides for the fabric card connector 46. The fabric card connector 46 has the same basic structure as that of the line card connector 40 in the present instance. Thus, in the same way as for the line card connector, each of a plurality of contact planes of the fabric card connector 46 can be entered into a respective one of the grooves so that connectors of the fabric card connector 46 can then engage with contact pins of the first connector 62. The orientation of the first connector 62 and the grooves therein means that the fabric card 12 is supported in a substantially vertical orientation.

In the example illustrated in FIG. 19, the orthogonal connector 60 provides an 8×8 array of connector pins 80 is provided that can support supports 64 differential pairs or 32 bi-directional serial channels (two wires per direction) in a footprint of 32.2×32.2 mm.

As mentioned above, the contact pins of the first and second midplane connectors 62 and 64 of a midplane connector pair 32 are connected by means of pass through vias in the midplane.

Figure 20:
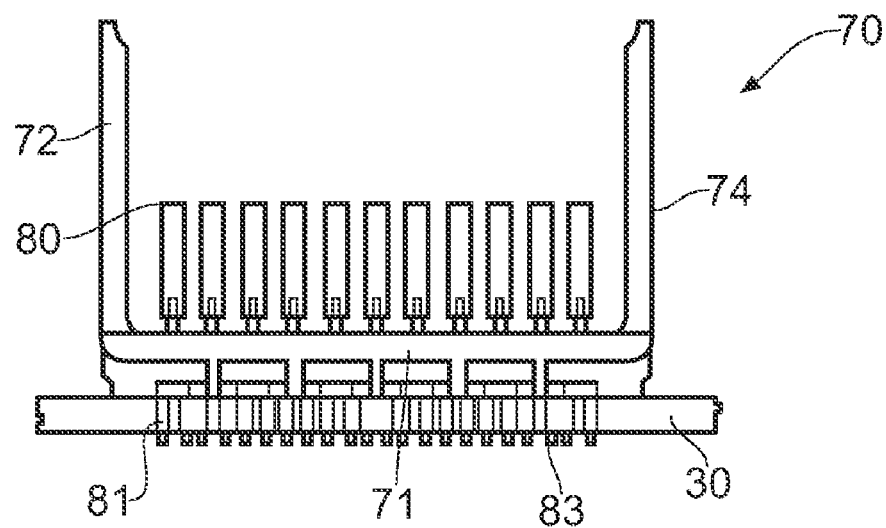
FIG. 20 is a schematic side view of one of the connectors of FIG. 19.

FIG. 20 illustrates a side view of an example of a midplane connector, for example the midplane connector 62 mounted on the midplane. In the example shown in FIG. 20 the midplane connector 64 comprises a substantially U-shaped frame 70 including a substantially planar base 71 and first and second substantially planar walls 72 and 74 that extend at substantially at 90 degrees from the base 71. The contact pins 80 are each connected to pairs of contact tails 81 that are arranged in sprung pairs that are arranged to be push fitted into pass through vias 83 in the midplane 30.

In use, the other midplane connector (e.g., the first midplane 62) of the midplane connector pair would be inserted into the pass through vias in the other side of the midplane 30 in the orthogonal orientation as discussed previously.

Figure 21:
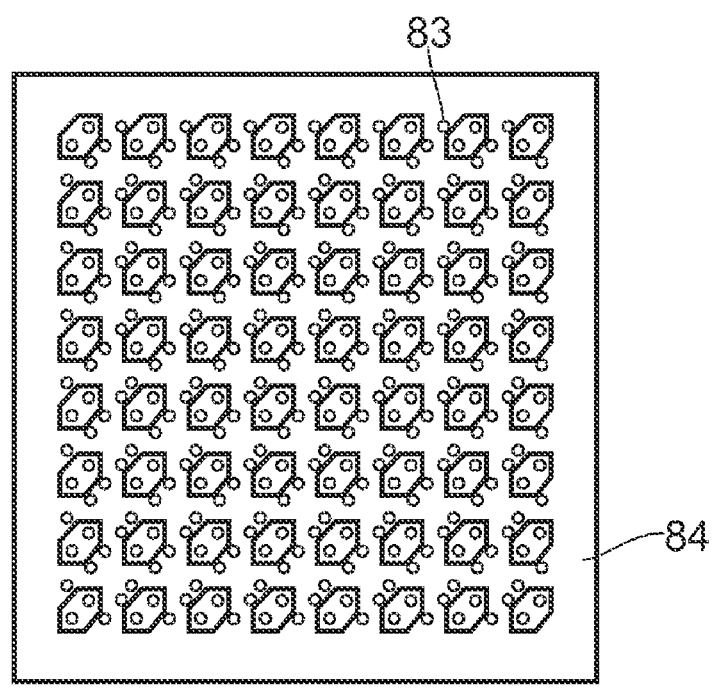
FIG. 21 is a plan view of an example configuration of vias for the orthogonal connector pairing of FIG. 19.
Figure 22:
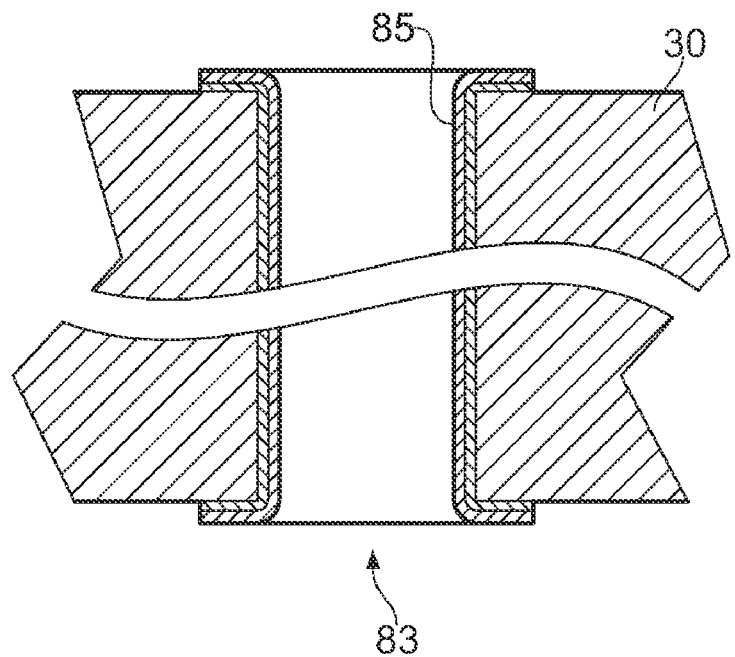
FIG. 22 is a cross-section through of a via.

FIG. 21 is a schematic representation of an area of the midplane for receiving the midplane connectors 62 and 64 of the midplane connector pair 32. This shows the array of vias 83. FIG. 22 is a schematic cross-section though such a via 83 in the showing the conductive wall 85 of the via 83. The conductive wall 85 can be formed by metal plating the wall of the via, for example.

Figure 23:
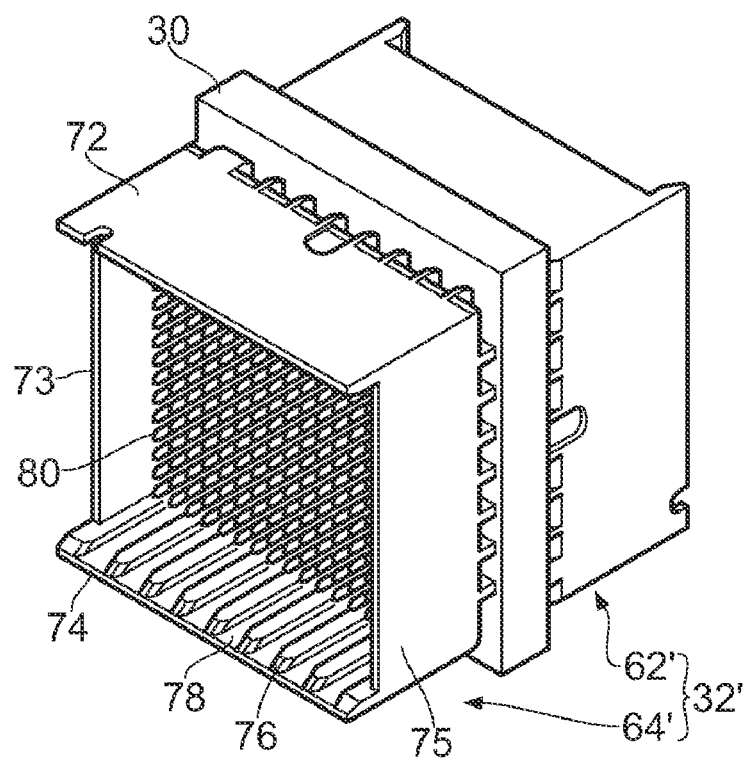
FIG. 23 is a schematic side view of example of an alternative to the connector of FIG. 20.

The examples of the midplane connectors described with reference to FIGS. 18 and 20 had a generally U-shape. However, other configurations for the midplane connectors are possible. For example FIG. 23 illustrates another example of a midplane connector pair 32', where the first and second midplane connectors 62' and 64' are generally the same as the first and second midplane connectors 62 and 64 described with reference to FIG. 19 except that, in addition to the first and second walls 72 and 74, third and fourth walls 73 and 75 are provided. The additional walls provide a generally box-shaped configuration that can facilitate the insertion and support for the cards to be connected thereto.

It will be appreciated that in other examples the first and second midplane connectors could have different shapes and/or configurations appropriate for the connections for the cards to be connected thereto.

The array of midplane connector pairs 32 as described above provides outstanding performance in excess of 10 Gbps over a conventional FR4 midplane because the orthogonal connector arrangements allow signals to pass directly from the line card to the fabric card without requiring any signal traces on the midplane itself. The orthogonal arrangements of the cards that can result from the use of the array of orthogonally arranged connector pairs also avoids the problem of needing to route a large number of signals on the midplane to interconnect line and fabric cards, minimizing the number of layers required. This provides a major simplification compared to existing fabric switches. Thus, by providing an array of such orthogonal connectors, each of a set of horizontally arranged line cards 12 can be connected to each of a set of vertically aligned fabric cards without needing intermediate wiring.

Figure 24:
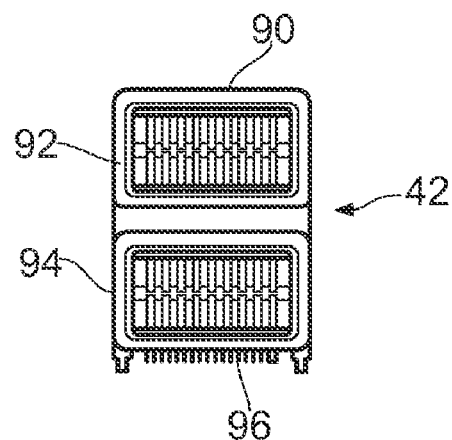
FIG. 24 is a schematic end view of an example cable connector.
Figure 25:
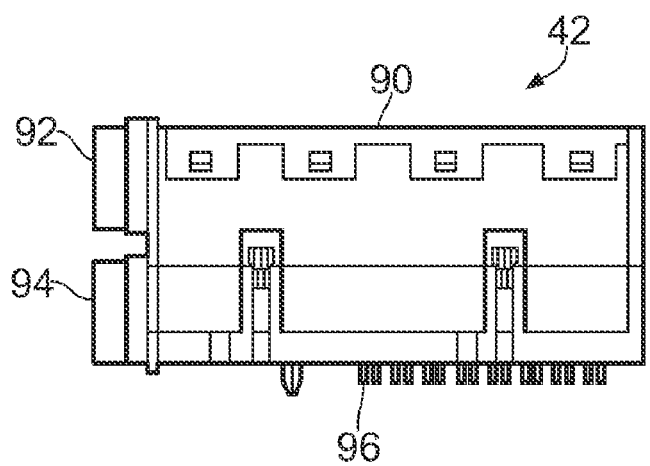
FIG. 25 is a schematic side view of the example cable connector.
Figure 26:
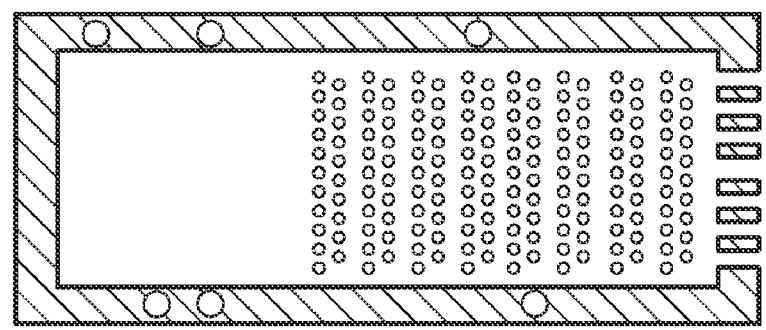
FIG. 26 represents a footprint of the cable connector.

FIGS. 24 and 25 provide an end view and a side view, respectively, of an example of a cable connector 42 as mentioned with reference to FIGS. 3 and 14. As shown in FIGS. 24 and 25, the cable connectors 24 and 25 include first and second cable connections 92 and 94 stacked within a single housing 90. This provides for a very compact design. Board contacts 96 are provided for connecting the connector to a line card 14. FIG. 26 is a plan view of the connector footprint for the board contact s 96 of the cable connector 42. The stacked arrangement facilitates the providing of line cards that are high density line cards supporting a 12× cable providing 24 line pairs with 3 4× links aggregated into a single cable. The cable connectors provide 12× cable connectors that are smaller than a conventional 4× connector, 3× denser than a standard InfiniBand 4× connector and electrically and mechanically superior. Using 12× cable (24 pairs) can be almost 50% more area efficient than three 4× cables and requires three times fewer cables to install and manage.

Figure 28:
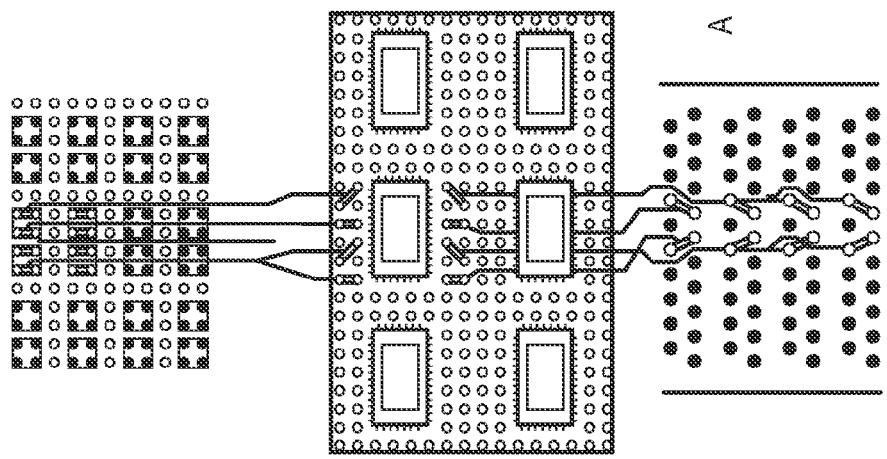
FIGS. 27 and 28 illustrates example of signal routing for a cable connector.
Figure 27:
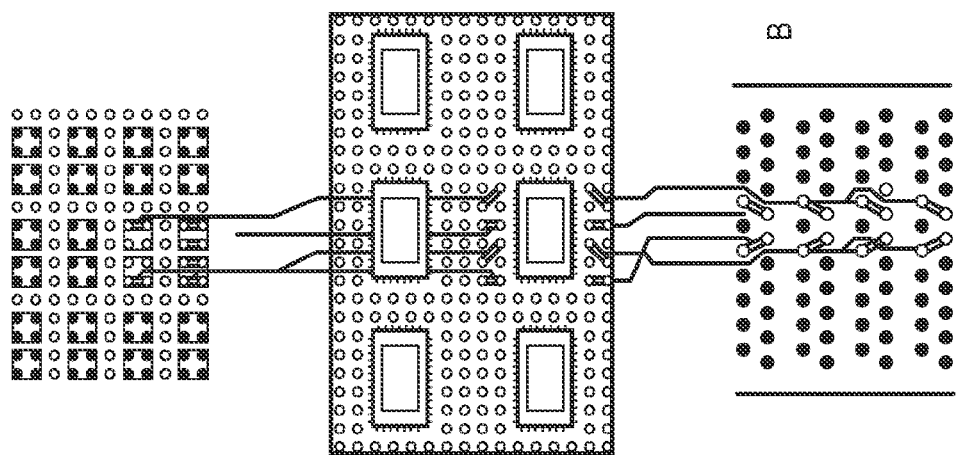

FIGS. 27 and 28 illustrate an example of the routing of signals from each of two 12× port sections 92 and 94 of a cable connector 42 to the equalizers and to a switch chip on a line card 14. FIG. 27 shown an example of routing from a first 12× port section. FIG. 28 shows an example of the routing from a second 12× port section. The transmit (Tx) lines are equalized, and can be connected directly from the switch chip to the cable connector. The can be routed on lower layers in order to minimize via stub effects.

Figure 29:
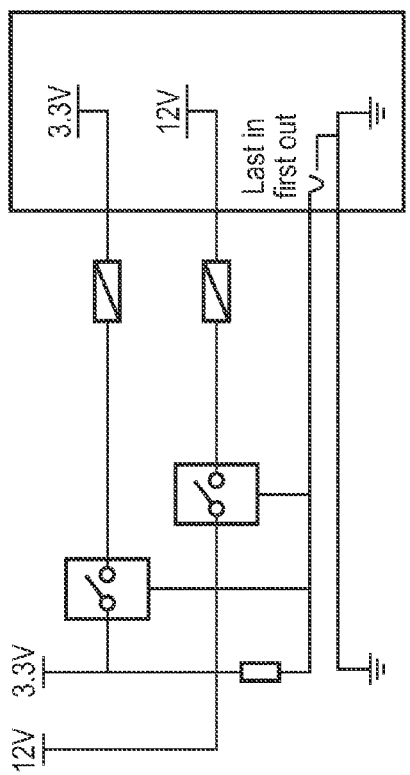
FIG. 29 illustrates an example of a power supply for the cable connector.
Figure 30:
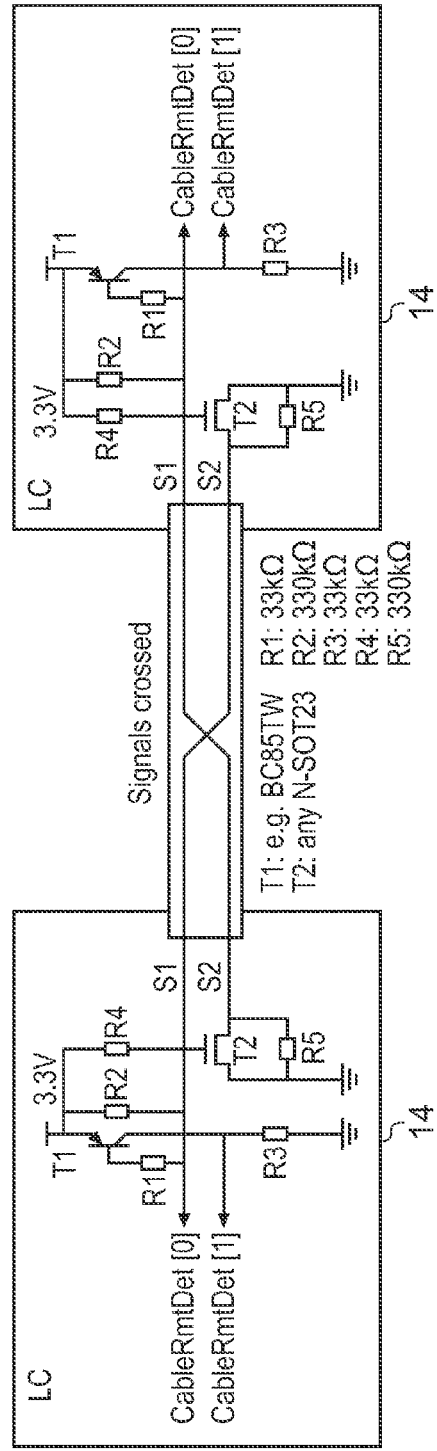
FIG. 30 illustrates an example of cable status sense detection circuitry.
Figure 31:
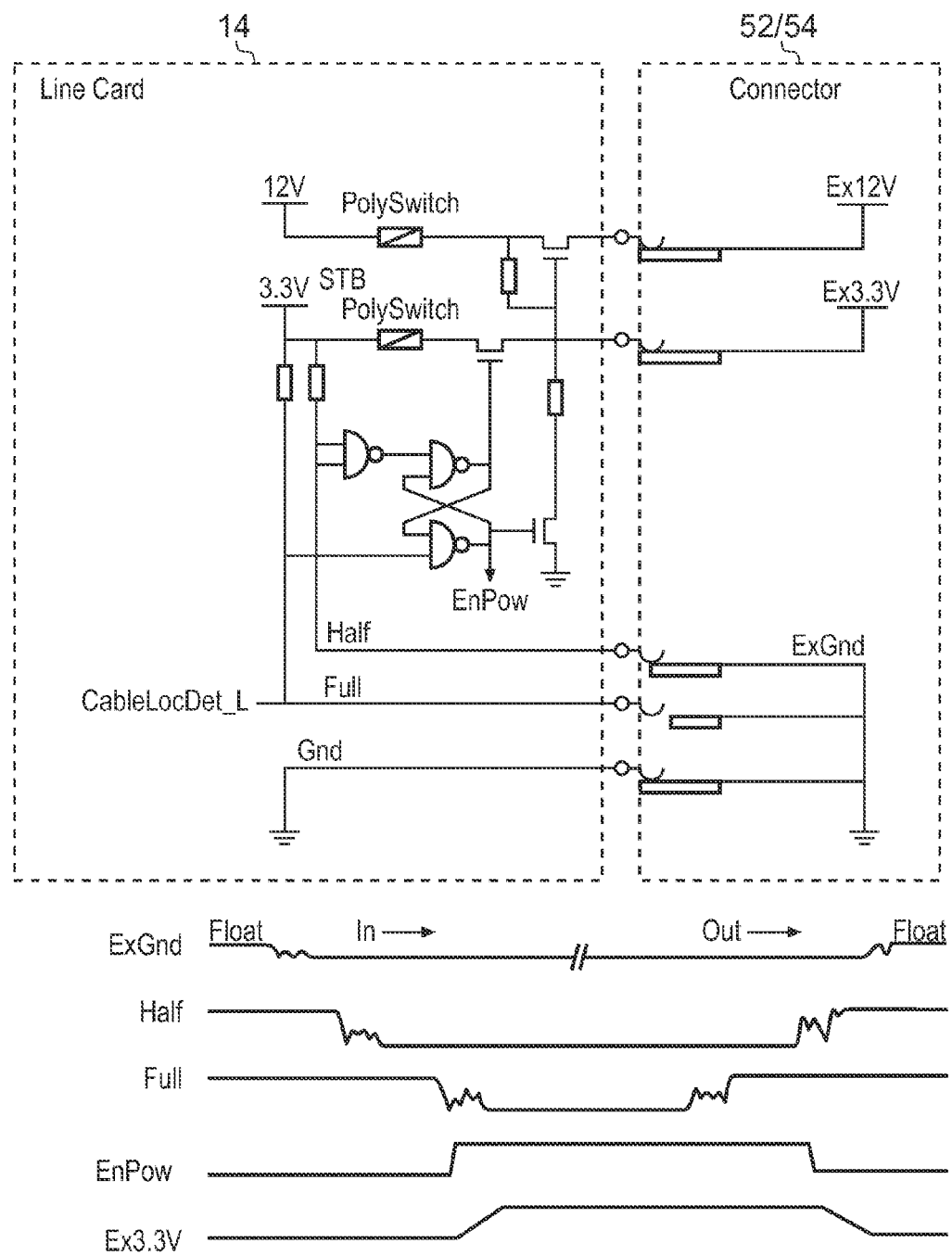
FIG. 31 illustrates an example of hot plug control circuitry.

FIG. 29 illustrates an example of a power supply for the cable connector and FIG. 30 illustrates an example of a cable status sense detection circuitry. The cable sense detection circuitry is operable to test from each end whether the other end is plugged or not, and, if plugged, to see if power from the power supply is on. Provisions are made such that "leaking" power from a powered to un-powered end is avoided. A valid status assumes that an active end is plugged. FIG. 31 is a schematic diagram of an example of a hot plug control circuit that enables hot plugging of cables. The switch chassis can thereby provide active cable support for providing active signal restoration at a cable connector. Active cable support can provides benefits of increased distances for copper cables as a result of active signal restoration at the connector, increased maximum cable distance by over 50%, using thinner and more flexible cables (e.g., reducing a cable diameter by up to 30%, which facilitates good cable management. A cable to connector interface can provide one, more or all of local and remote cable insertion detection, cable length indication, remote node power-on detection, remote power, a serial number and a management interface.

Figure 32:
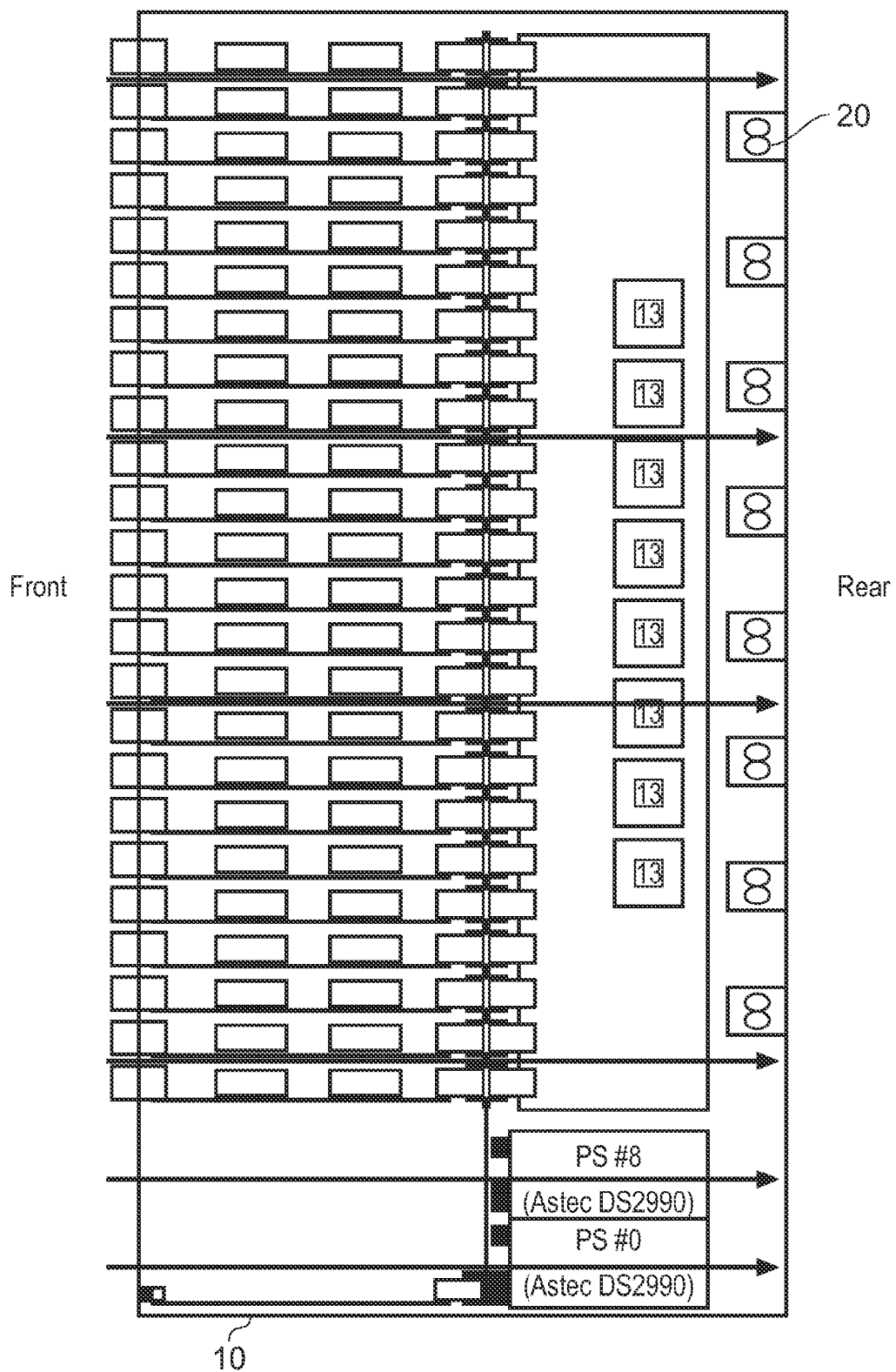
FIG. 32 is a schematic representation of airflow though a switch chassis.

FIG. 32 is a schematic representation of the airflow through an example switch chassis. As illustrated by the arrows, the airflow is from the front to the rear, being drawn through by fans 20 in the fabric cards 12 and the power supplies 18.

The air inlet is via perforations at the line card 14 front panel. Fans 20 at the fabric cards 12 pull air across the line cards, though the openings 34 in the vertical midplane 30 and across the fabric cards 12.

Line card cooling is naturally redundant since the fabric cards are orientate orthogonally to the line cards. In other words, cooling air over each line card is as a result of the contribution of the effect of the fans of the fabric cards along the line card due to the respective orthogonal alignment. In the case that a fabric card fails or is removed, a portion of the cooling capacity is lost. However, as the cooling is naturally redundant the line cards will continue to operated and be cooled by the remaining fabric cards. Each fan is internally redundant and the fans on the fabric cards 12 can be individually hot swappable without removing the fabric card 12 itself. The fabric card 12 and line card 14 slots can be provided with blockers to inhibit reverse airflow when a card is removed. Empty line card 14 and fabric card 12 slots can be loaded with filler panels that prevent air bypass.

Each power supply has an internal fan that provides cooling for each power supply. Fans at the power supplies pull air through chassis perforations at the rear, across the chassis management cards 18, and through the power supply units 16. Chassis management card cooling is naturally redundant as multiple power supply units cool a single the chassis management card.

It will be appreciated that changes and modifications to the above described examples are possible. For example, although in the present example cooling if provided by drawing air from the front to the rear, in another example cooling could be from the rear to the front.

Also, although in the above described examples the fabric cards and the switch cards are described as being orthogonal to each other, they do not need to be exactly orthogonal to each other. Indeed, in an alternative example they could be angled with respect to each other but need not be exactly orthogonal to each other.

Also, in the above described examples the midplane connector pairs 32 are configured as first and second connectors 62 and 64, in another example they could be configured as a single connector that is assembled in the midplane. For example, through connectors could be provided that extend through the midplane vias. The through connectors could be manufactured to be integral with a first connector frame (e.g., a U-shaped frame or a box-shaped frame as in FIGS. 19 and 23, respectively) and the contacts inserted through the vias from a first side f the midplane 30. Then a second connector frame could be inserted over the connectors on the second side of the midplane 30 in a mutually orthogonal orientation to the first connector frame.

An example cable-based switch chassis can provide a very large switch having, for example, one or more of the following advantages, namely a 3456 ports non-blocking Clos (or Fat Tree) fabric, a 110 Terabit/sec bandwidth, major improvements in reliability, a 6:1 reduction in interconnect cables versus leaf and core switches, a new connector with superior mechanical design, major improvement in manageability, a single centralized switch with known topology that provides a 300:1 reduction in entities that need to be managed.

A switch system as described above includes a large number of interconnect cables. In such a system, it is desirable to be able to isolate faults where problems with connectivity and communication across a cable-based interconnect link is identified. In such a case it would be desirable to be able to isolate a fault to one or other of the end-points (connector or interface logic) of the cable, or to the cable itself (or potentially to a specific connector on the cable).

Figure 33:
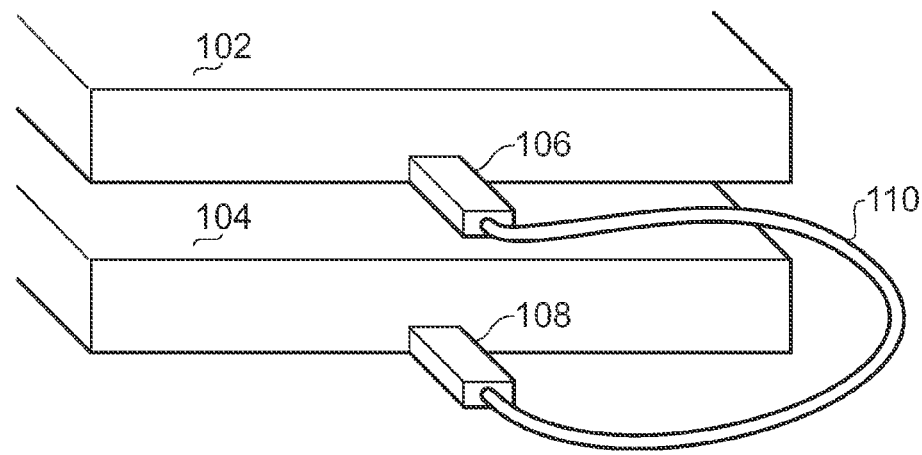
FIG. 33 is a schematic diagram illustrating the interconnection of system components using a cable.

FIG. 33 is a schematic representation of first and second system components 102 and 104 (for example first and second chassis components, e.g., line cards) interconnected via a cable 110 having a first cable connector 106 at a first end point thereof and a second cable connector 108 at a second end point thereof. In a complex system there can typically be many such cables 110 interconnecting system components.

As mentioned in the introduction, one approach to addressing fault isolation could be to move cables around. However, in general, even moving cables around may not provide a solution to fault isolation. Moreover, moving cables imposes other problems in terms of potentially having to obstruct other on-going data-traffic (i.e. when no idle and operational interconnect interface connector is available). Another difficulty is that damaged connector pins can cause the problem to propagate from the chassis connector to the cable connector (or vice versa), whereby moving cables around imposes a risk for "contaminating" healthy chassis connectors due to the cable connector being bad. In such cases, the diagnostics process could lead to more damage within the system as well as significant confusion until the contamination and/or inherent problem has been determined. It is also desirable to be able to isolate a problem as much as possible before any manual intervention is required.

In one aspect, there is provided a system of multiple chassis instances interconnected via cables and with the ability to automatically check the "mechanical connectivity", that is cables with connectors connected to field replaceable units (FRUs) in the various chassis instances, independently of whether all components are fully operational.

In another aspect, there is provided a loopback connector for a cable system, the loopback connector comprising loopback logic. The loopback connector can be configured to operate as a connector protection during shipping.

For example, a method of testing a system component can include connecting such a loopback connector to a connector of a system component and performing one or more loopback tests. In one example the loopback connector can be connected to the connector of the system component and one or more loopback tests can be performed prior to shipping. The loopback connector can then be used to protect the connector in transit, i.e. during shipping, by leaving it connected to the connector of the system component. The loopback connector can then be used for performing the one or more loopback tests prior to removing the loopback connector.

Examples of mechanisms for this can include using signal-conditioner-based active cables and/or loopback connectors in order to provide complete fault isolation capabilities for associated end-point to end-point connectivity.

By being able to isolate the problem to either side of the cable, the number of manual test operations required is reduced, and hence, the chance of manual error as well as the total repair time may be significantly reduced.

Also, the number of diagnostics operations that represents destructive interference with on-going data-traffic may be reduced.

Figure 34:
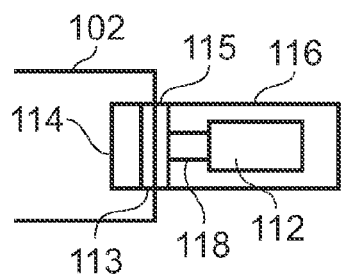
FIG. 34 is a schematic representation of a component loopback connector.
Figure 35:
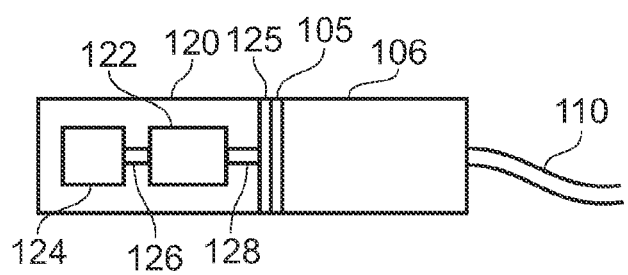
FIG. 35 is a schematic representation of a cable loopback connector.

In one example embodiment, in order to avoid moving cables from one chassis connector to another during the diagnostics process, two kinds of special loopback connectors can be used. One loopback connector 116, a schematic example of which is shown in FIG. 34, includes a connector array 115 that can be plugged into a connector array 113 of a chassis connector 114 of a system component 102 just like a normal cable connector. One loopback connector 120, a schematic example of which is shown in FIG. 35, includes a connector array 125 that can be plugged into a connector array 105 of a cable connector (e.g. 106) at a remote, disconnected, end of a cable 110. Each of the connector arrays 113, 115, 125, 105 includes an appropriate set of electrical and/or optical contact elements as required for the connectors concerned.

A chassis loopback connector 116, FIG. 34, can be made in a relatively simple manner since the short distances involved will in general not impose a significant signal integrity (or signal loss) problem and can include loopback logic 112 for simulating cable functionality. Nevertheless, where very high frequency data signaling on interconnect links (e.g., DDR and QDR rates on InfiniBand) are employed, it is desirable that such loopback connectors do not increase the chance of observing link errors when performing traffic tests. The loopback logic 112 is connected via connections 118 to the connector array 115 of the chassis loopback connector 116.

A cable loopback connector 120, FIG. 35, inherently doubles the distance between the involved transmission (TX) and receive (RX) ports (except for the case where very short cables are being used). The loopback logic 122 of the cable loopback connector 120 can include repeater and/or signal-conditioner functionality to avoid false problem symptoms being observed due to increased link length as well as simulating chassis component functionality. The cable loopback connector 120 can be formed as a self-contained device with separate power-supply 124. The loopback logic 122 is connected via connections 128 to the connector array 125 of the cable loopback connector 120. The power supply 124 is connected to the loopback logic 122 via power connections 126.

By utilizing active cable implementations with built-in signal-conditioner functionality that is designed to make sure that proper signaling is provided for the full cable-length, the complexity of the cable-loopback-connector can be reduced to the same level as for a chassis-loopback-connector. In a simple case, the cable itself can be designed to provide sufficient power to the active parts in the remote end, but if not, power can still be provided from an external source through a (passive) cable-loopback-connector. This can be achieved, for example, using a USB connection between the connector and a suitably configured mobile device, for example a Personal Data Assistant (PDA), a laptop, a mobile telephone, etc.

Cable/connector FRU and inventory information can be used to explicitly recognize and report both a chassis and a cable type loopback connector in terms of current connectivity for the relevant chassis connectors.

If a cable loopback connector attached to a remote end of a cable cannot be explicitly identified via in-band or side-band based information retrieval, a cable based loopback can indirectly be identified by observing a standard cable connector at the local side, but then also observe that link training takes place, and that the local transmit (TX) port is connected ("looped back") to the local receive (RX) port. A mobile device as referenced above connected to a cable connector can also be configured to provide connectivity information.

Such loopback arrangements can work in concert with loopback support in the interface logic of interconnect adapter or switch implementations. Loopback logic can be used to help in making sure that the end-point logic is fully operational even if not all external connectivity is operational.

Loopback logic associated with the chassis side connector can help verifying that local print traces have not been damaged (in general not very likely) or that no local electrical noise is causing signal integrity problems within the board/chassis. Such loopback logic can also represent an alternative to built-in loopback support in the switch/adapter link interface implementation.

Chassis side loopback logic cannot assist in isolating a problem to the cable or the chassis, and hence cannot assist to one or the other end of the cable connection either. However, by implementing loopback logic as part of the repeater or signal-conditioner functionality within an active cable connector implementation, it is possible to isolate a problem to either side of a cable connection without requiring any manual intervention (i.e., the loopback operation can be controlled by software from either end of the cable via a sideband communication channel like I2C.). In this way, control software in either end of the connection can initiate testing of:
  a complete endpoint-to-endpoint link
  a link segment of local chassis connector and cable connector only (i.e., via the loopback path in the remote cable connector)
  a link segment of local chassis connector and cable connector plus the cable to a remote cable connector (i.e., via the loopback path in the local cable connector)

The test result can give an indication of which side(s) of the cable problems seems to be related. In order to isolate a problem to a cable connector or the corresponding chassis connector (or other chassis side components), testing with both chassis loopback connectors as well as a cable loopback connector can be performed.

In principle, a chassis side loopback connector can be used as a protection cover on chassis (switch FRU) connectors when a switch FRU is shipped from a factory. By having such loopback connectors as part of the normal production procedure, it is possible to use the same test mechanisms for production testing as the ones used in the field for trouble-shooting and diagnostics of link problems (i.e., link-training in loopback mode, different kinds of loopback packet traffic, as well as special hardware (HW) generated test patterns).

In this way, the integrity of the connectors can be verified before a switch FRU leaves the factory, without any subsequent re-cabling. In addition, when the switch FRU is installed and powered up in the field (i.e., initially), it is possible to perform the same verification before any initial cabling has taken place.

An alternative embodiment of a loopback connector can be in the form of a combined chassis and cable loopback connector 130 that can be placed between a chassis connector and a cable connector.

In such an example, illustrated in FIG. 36, a combined loopback connector (termed hereinafter an intermediate connector) 130 includes both a chassis side connector array 135 (for connection to a connector array 113 of a chassis connector 114 of a chassis component 102) as well as a cable side connector array 145 (for connection to a connector array 105 of a cable connector 106 of a cable 110). Each of the connector arrays 113, 135, 145, 105 includes an appropriate set of electrical and/or optical contact elements as required for the connectors concerned.

Loopback logic 132 in the intermediate connector 130 can provide a transparent "pass-through" mode as well as a loopback mode on either side. The loopback logic 132 is connected to the connector arrays 135 and 145 by connections 136 and 138, respectively. The loopback mode on either side can be as described above for a cable connector with built in loopback functionality. In the example of an intermediate connector 130 shown in FIG. 36, the loopback logic 132 includes signal conditioner logic 134 for processing signal levels of signals passing through the intermediate connector 130.

Figure 36:
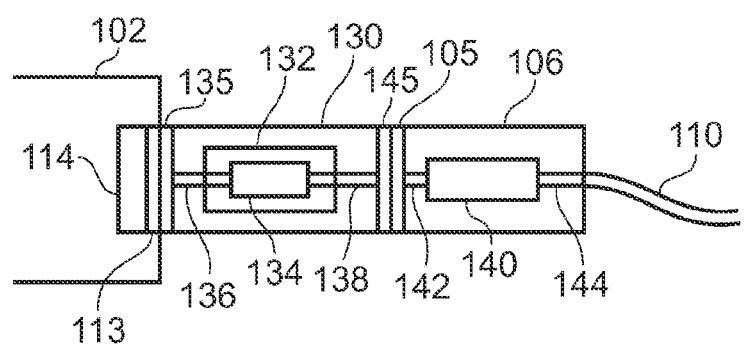
FIG. 36 is a schematic representation of a combined component and cable loopback connector.

The intermediate connector 130 of FIG. 36 can further increase the protection against damaged chassis connectors as the chassis components 102 (e.g. a line-card) can be shipped with such intermediate connectors 130 installed. However, unlike the loopback connectors described with reference to FIGS. 34 and 35, the intermediate connectors 130 of FIG. 36 connectors do not need to be removed at installation following shipping as the cable connector 106 intended cable 110 can be inserted in this intermediate connector 130 rather than directly into the chassis connector 114. In this way, any potential damage caused by inserting the cable connector 106 is likely to affect the intermediate connector 130 rather than the chassis connector 114.

Also, as such an intermediate connector 130 is much easier to handle than a cable connector 102 (where the weight and "bend resistance" of the actual cable 110 reduces the ability to fully control the insertion of the cable connector 106), replacing an intermediate connector 130 in a chassis connector 114 is likely to be less hazardous than replacing an actual cable connector 106.

Such an intermediate connector 130 can also represent a flexible way of providing that different types of both active and passive cables (i.e. in terms of link signal conditioner logic) can be tuned to work with a particular type of chassis connectors that may represent specific signal levels and/or signal conditioner capabilities. By providing a programmable (e.g. via I2C connectivity to the intermediate connector) signal conditioner "boost" level, the behavior of the signal conditioner logic 134 in the intermediate connector 130 can be tuned to an optimal setting as a function of the properties of both the signal from the chassis connector, the type and length of the cable as well as the properties of the receiver logic at the remote end(s) of the cable. The programmable signal conditioner logic 134 can be programmed using one or more or all available programming options provided in a particular embodiment, for example via both local and/or remote I2C connectivity and/or via a side-band from, for example, a personal data assistant (PDA) or the like, etc.

This functionality can facilitate "margin checks" for newly received cables as well as for cables that have been moved locally and/or that have (recently) experienced link errors during operation. Such tests can be based on repeated traffic tests with different signal conditioner settings in order to determine the range in which the links(s) through the connectors and cable(s) operates reliably. As a result, each cable can be checked against expected operational margins not just during production tests at the factory, but also when installed in an actual system in the field.

Accordingly, with such an intermediate connector 130 configured to operate as a loopback connector for both a chassis connector and a cable connector as well as to provide pass-through connectivity between the cable and the chassis connectors, following shipping of a system component, one or more loopback tests can be performed prior to connecting a cable connector 106 of a cable 110 to the cable side of the loopback connector without removing the loopback connector 130 from the chassis of the component 102. Adjustments of configuration settings for the signal conditioner logic 134 in the loopback connector 130 can then be performed when a cable is plugged in.

The configuration settings for the signal conditioner logic 134 can be a function of one or more of chassis side signal strength, cable type, cable length and properties of remote receiver logic. A series of data traffic tests can be performed, for example, with different configuration settings for the signal conditioner logic in order to determine the range of values for which the established link operates reliably.

Programmable signal conditioner logic 140 can be provided in a connector of an active cable instead of or in addition to the signal conditioner logic 134 within an intermediate (loopback/pass-through) connector 130. The loopback logic 140 can be connected to the connector arrays 105 by connections 142 and to connections (connector lines) in the cable 144. With such an arrangement the adjustment of signal conditioner configuration settings for the signal conditioner logic 136 can be performed in a cable connector of the connected active cable, rather than in the intermediate connector 130.

With reference to FIGS. 34-36 above, it should be noted that the connector arrays and the connections thereto are shown schematically, and may comprises any appropriate number and configuration of electrical and/or optical contact elements and connections as required for a particular implementation.

An embodiment of the invention can provide for fault-isolation of cable based interconnect links without any need to move cables around, and with a minimal number of required manual operations in order to isolate non-functional elements of the link implementation.

Providing chassis side and cable side special loopback connectors can allow complete testing of the link from one end-point to the other without having to move any cables around, and without depending on any complex "node" implementation in order to test the remote end of a cable. Also if loopback functionality, for example that is software controllable, is provided within a cable connector itself, it can become possible to isolate a problem to one side of link without requiring any manual operations at all.

Example embodiments of the invention can provide a loopback connector for a system comprising at least one system component having at least one component connector and at least one cable interconnect having at least one cable connector. The loopback connector can include a connector arrangement connectable to component connector and/or a cable connector. The loopback connector can include loopback logic for simulating cable and/or system component functionality. In an example the loopback connector can include repeater and/or signal-conditioner functionality. In various examples the loopback connector can include a power-supply and/or can be powered from a power source at a remote end of the cable. In an example implementation the loopback connector can also operate as a connector protector during shipping.

In a method of using such a loopback connector, the loopback connector can be connected to a component connector of a system component and/or a cable connector of a cable and one or more loopback tests are performed. The loopback test can, for example, be performed prior to shipping the system component or the cable. The loopback connector can, for example, then be left connected to the connector of the system component or cable during shipping to protect the connector of the system component or cable in transit. The loopback test can, for example, then be repeated following shipping, and prior to removing the loopback connector.

Although the embodiments above have been described in considerable detail, numerous variations and modifications will become apparent to those skilled in the art once the above disclosure is fully appreciated.

What is claimed is:

1. A loopback connector for a system comprising at least one system component having at least one component connector and at least one cable interconnect having at least one cable connector, the loopback connector comprising:
   a connector arrangement configured to be connectable simultaneously to both of the component connector and the cable connector; and
   loopback logic for simulating cable interconnect functionality when the connector arrangement is connected to the component connector and for simulating system component functionality when the connector arrangement is connected to the cable connector;
   wherein the loopback connector is selectively configured to operate as a loopback connector for both a chassis connector and a cable connector as well as to provide pass-through connectivity between the cable and the chassis connectors.

2. The loopback connector of claim 1, configured to be connected to a system component connector.

3. The loopback connector of claim 2, wherein the loopback logic comprises loopback logic for simulating cable response characteristics.

4. The loopback connector of claim 3, comprising repeater and/or signal-conditioner functionality.

5. The loopback connector of claim 1, configured to be connected to a cable connector at a free end of a cable.

6. The loopback connector of claim 5, comprising a power-supply.

7. The loopback connector of claim 5, wherein the loopback logic is powered from a power source at a remote end of the cable.

8. The loopback connector of claim 1, configured to operate as a connector protector during shipping.

9. The loopback connector of claim 8, configured to provide programmable signal conditioner logic.

10. The loopback connector of claim 9, configured to provide programmable signal conditioner logic via I2C.

11. A system comprising at least two subsystems interconnected via cables, the cables comprising connectors connectable to field replaceable units (FRU) in the subsystems, wherein the system is operable automatically to check the mechanical connectivity formed by the cables independently of whether all system components are fully operational, wherein at least a connector for at least a cable includes a loopback connector, the loopback connector comprising:
- a connector arrangement configured to be connectable simultaneously to both the cable and a connector for a FRU in one of the subsystems; and
- loopback logic for simulating cable interconnect functionality when the connector arrangement is connected to the FRU and for simulating system component functionality when the connector arrangement is not connected to the FRU;
- wherein the loopback connector is selectively configured to operate as a loopback connector for both the connector for the FRU and the connector for the cable as well as to provide pass-through connectivity between the cable and the connector for the FRU.

12. The system of claim 11, wherein a subsystem is located in a chassis.

13. A method comprising connecting a loopback connector to at least one of a component connector of a system component and a cable connector of a cable and performing at least one loopback test, wherein the loopback connector comprises:
- a connector arrangement configured to be connectable simultaneously to both of said component connector and said cable connector; and
- loopback logic for simulating cable interconnect functionality when the connector arrangement is connected to the component connector and for simulating system component functionality when the connector arrangement is connected to the cable connector;
- wherein the loopback connector is selectively configured to operate as a loopback connector for both a chassis connector and a cable connector as well as to provide pass-through connectivity between the cable and the chassis connectors.

14. The method of claim 13, comprising connecting a loopback connector to a component connector of a system component and performing at least one loopback test.

15. The method of claim 14, wherein, prior to shipping the system component, the loopback connector is connected to the component connector and the at least one loopback test is performed.

16. The method of claim 15, comprising leaving the loopback connector connected to the component connector during shipping of the system component to protect the component connector in transit.

17. The method of claim 16, comprising, following shipping of the system component, performing the at least one loopback test prior to removing the loopback connector.

18. The method of claim 16, further comprising, following shipping of the system component, performing the at least one loopback test prior to connecting the cable connector of a cable to the cable side of the loopback connector without removing the loopback connector from the chassis.

19. The method of claim 18, comprising, performing adjustments of configuration settings for signal conditioner logic in the loopback connector when a cable is plugged in.

20. The method of claim 19, comprising, performing the adjustment of signal conditioner configuration settings for signal conditioner logic in a cable connector of the connected cable.

21. The method of claim 13, comprising connecting a loopback connector to a cable connector of a cable and performing at least one loopback test.

22. The method of claim 21, wherein, prior to shipping the cable, the loopback connector is connected to the cable connector and the at least one loopback test is performed.

23. The method of claim 22, comprising leaving the loopback connector connected to the cable connector during shipping of the cable to protect the cable connector in transit.

24. The method of claim 23, comprising, following shipping of the cable, performing the at least one loopback test prior to removing the loopback connector.

* * * * *